United States Patent
Jang et al.

(10) Patent No.: US 9,078,189 B2
(45) Date of Patent: Jul. 7, 2015

(54) METHOD FOR PERFORMING INTER-MOBILE STATION (MS) HANDOVER IN RADIO ACCESS SYSTEM AND MS THEREFOR

(75) Inventors: Jiwoong Jang, Anyang-si (KR); Kyujin Park, Anyang-si (KR); Hangyu Cho, Anyang-si (KR); Dongcheol Kim, Anyang-si (KR); Dongguk Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 13/981,482

(22) PCT Filed: Jan. 25, 2012

(86) PCT No.: PCT/KR2012/000594
§ 371 (c)(1),
(2), (4) Date: Jul. 24, 2013

(87) PCT Pub. No.: WO2012/102546
PCT Pub. Date: Aug. 2, 2012

(65) Prior Publication Data
US 2013/0303171 A1  Nov. 14, 2013

Related U.S. Application Data

(60) Provisional application No. 61/435,792, filed on Jan. 25, 2011.

(51) Int. Cl.
| | |
|---|---|
| *H04W 36/30* | (2009.01) |
| *H04W 36/38* | (2009.01) |
| *H04W 28/06* | (2009.01) |
| *H04W 92/18* | (2009.01) |

(52) U.S. Cl.
CPC .............. *H04W 36/30* (2013.01); *H04W 28/06* (2013.01); *H04W 36/38* (2013.01); *H04W 92/18* (2013.01)

(58) Field of Classification Search
CPC .............. H04W 24/10; H04W 84/045; H04W 36/0083; H04W 36/30; H04W 28/06; H04W 36/38; H04W 92/18
USPC ............... 455/436–444, 422.1; 370/328, 329, 370/331–334
See application file for complete search history.

(56) References Cited

U.S. PATENT DOCUMENTS 6,002,678 A * 12/1999 Jayapalan et al. ............. 370/331
7,013,144 B2 * 3/2006 Yamashita et al. ............. 455/450
(Continued)

OTHER PUBLICATIONS

3rd Generation Partnership Project (3GPP), "Technical Specification Group Services and System Aspects; System Improvements for Machine-Type Communications; (Release 10)," 3GPP TR 23.888 V1.0.0, Jul. 2010, 80 pages (relevant sections: paragraph 6.9).
(Continued)

*Primary Examiner* — Ajit Patel
(74) *Attorney, Agent, or Firm* — Lee, Hong, Degerman, Kang & Waimey

(57) ABSTRACT

A method of performing inter-mobile station (MS) handover in a radio access system and an MS therefor are disclosed. The method includes a first MS receiving an inter-MS handover indication message from a base station (BS) while performing inter-MS communication with a second MS, and the first MS performing inter-MS handover from the second MS to another MS according to the inter-MS handover indication message. The inter-MS handover is decided according to channel quality between the first MS and the second MS or channel quality between the second MS and the BS.

5 Claims, 24 Drawing Sheets

(56) References Cited

U.S. PATENT DOCUMENTS

2009/0323633 A1* 12/2009 Burgess et al. ............... 370/331
2011/0122840 A1* 5/2011 Kim ............................. 370/331
2013/0150051 A1* 6/2013 Van Phan et al. ............. 455/437

OTHER PUBLICATIONS

CATT, "Consideration on MTC features," 3GPP TSG RAN WG3 Meeting #66bis, R3-100309, Jan. 2010, 5 pages.

Huawei, et al., "Network improvements for MTC Monitoring," 3GPP TFG SA WG2 Meeting #78, SA WG2 Temporary Document, TD S2-101075, Feb. 2010, 4 pages.

PCT International Application No. PCT/KR2012/000594, Notification of Transmittal of the International Search Report and the Written Opinion of the International Searching Authority, or the Declaration dated Sep. 27, 2012, 8 pages.

* cited by examiner

METHOD FOR PERFORMING INTER-MOBILE STATION (MS) HANDOVER IN RADIO ACCESS SYSTEM AND MS THEREFOR

CROSS-REFERENCE TO RELATED APPLICATIONS

This application is the National Stage filing under 35 U.S.C. 371 of International Application No. PCT/KR2012/000594, filed on Jan. 25, 2012, which claims the benefit of U.S. Provisional Application Ser. No. 61/435,792, filed on Jan. 25, 2011, the contents of which are all hereby incorporated by reference herein in their entirety.

TECHNICAL FIELD

The present invention relates to a radio access system and, more particularly, to a method and apparatus for performing inter-mobile station (MS) handover in a radio communication system.

BACKGROUND ART

A conventional base station (BS) based radio access system is defined as communication between a BS or an equivalent of the BS and a mobile station (MS) and an MS which performs communication with a BS in a radio access system is controlled by the BS or the equivalent of the BS. Since the BS controls operations of all MSs according to a predetermined rule, efficiency may be deteriorated according to an application or a channel environment of an MS.

In a conventional BS based radio access system, a relay node (RN) may be considered for, for example, enlargement of high data rate coverage, improvement of group mobility, temporary network deployment, improvement of cell edge throughput and/or provision of network coverage to a new area. An RN refers to a node for receiving a signal from a source node and transmitting the signal to a destination node. The RN may be more easily deployed than the base station. However, since the RN must be connected to the BS through a predetermined backbone network and does not have mobility, there are restrictions in terms of solving a shadow area and coverage extension.

In order to solve such problems, as a method of supporting high-rate data transmission, solving a shadow area and realizing coverage extension, a method of directly performing communication between MSs with good channel states has been studied. Up to now, as communication between MSs, a transmission scheme or a method of grouping MSs participating in communication between the MSs has mainly been studied. In particular, the majority of studies have proposed new transmission schemes with improved performance as compared to conventional schemes in a specific situation, but handover in communication between MSs has received little attention. In particular, unlike handover between BSs in a conventional BS based radio access system, handover between MSs needs to consider not only handover between an MS and a BS but also handover between MSs. Therefore, since handover between MSs is different from handover in a conventional BS based radio access system, there is a need for a new handover process.

DISCLOSURE OF INVENTION

Technical Problem

An object of the present invention devised to solve the above problem lies in a method and apparatus for performing inter-MS handover in a radio access system and, preferably, in a radio communication system supporting communication between MSs.

The technical problems solved by the present invention are not limited to the above technical problems and those skilled in the art may understand other technical problems from the following description.

Solution to Problem

The object of the present invention can be achieved by providing a method of performing inter-mobile station (MS) handover in a radio access system, the method including a first MS receiving an inter-MS handover indication message from a base station (BS) while performing inter-MS communication with a second MS, and the first MS performing inter-MS handover from the second MS to another MS according to the inter-MS handover indication message, wherein the inter-MS handover is decided according to channel quality between the first MS and the second MS or channel quality between the second MS and the BS.

The channel quality may be measured using any one of a signal to interference plus noise ratio (SINR) value, a signal to noise ratio (SNR) value, a bit error ratio (BER) value, a frame error ratio (FER) value, the number of times of data retransmission and a modulation and coding scheme (MCS) level.

The performing the inter-MS handover may include performing inter-MS handover while performing handover from the BS to another BS.

The performing the inter-MS handover may include performing inter-MS handover after the first MS completes handover from the BS to another BS.

The method may further include the first MS measuring channel quality between the first MS and the second MS and requesting inter-MS handover to the BS.

The method may further include the second MS measuring channel quality between the first MS and the second MS or channel quality between the second MS and the BS and requesting inter-MS handover to the BS.

The method may further include the first MS receiving reference signals for channel measurement from one or more MSs, the first MS measuring channel quality between the one or more MSs and the first MS using the reference signals for channel measurement, the first MS transmitting information about the channel quality between the one or more MSs and the first MS to the BS, and the first MS receiving information indicating the another MS among the one or more MSs from the BS.

The method may further include the first MS transmitting a reference signal for channel quality measurement between the first MS and one or more MSs to the one or more MSs, and the first MS receiving information indicating the another MS among the one or more MSs from the BS. The another MS may be an MS decided based on channel quality information between the first MS and the one or more MSs, which is measured by the one or more MSs based on the reference signals and is transmitted to the BS.

Advantageous Effects of Invention

According to embodiments of the present invention, it is possible to perform efficient communication by performing inter-MS handover in a radio access system and, preferably, in a wireless communication system supporting communication between MSs.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
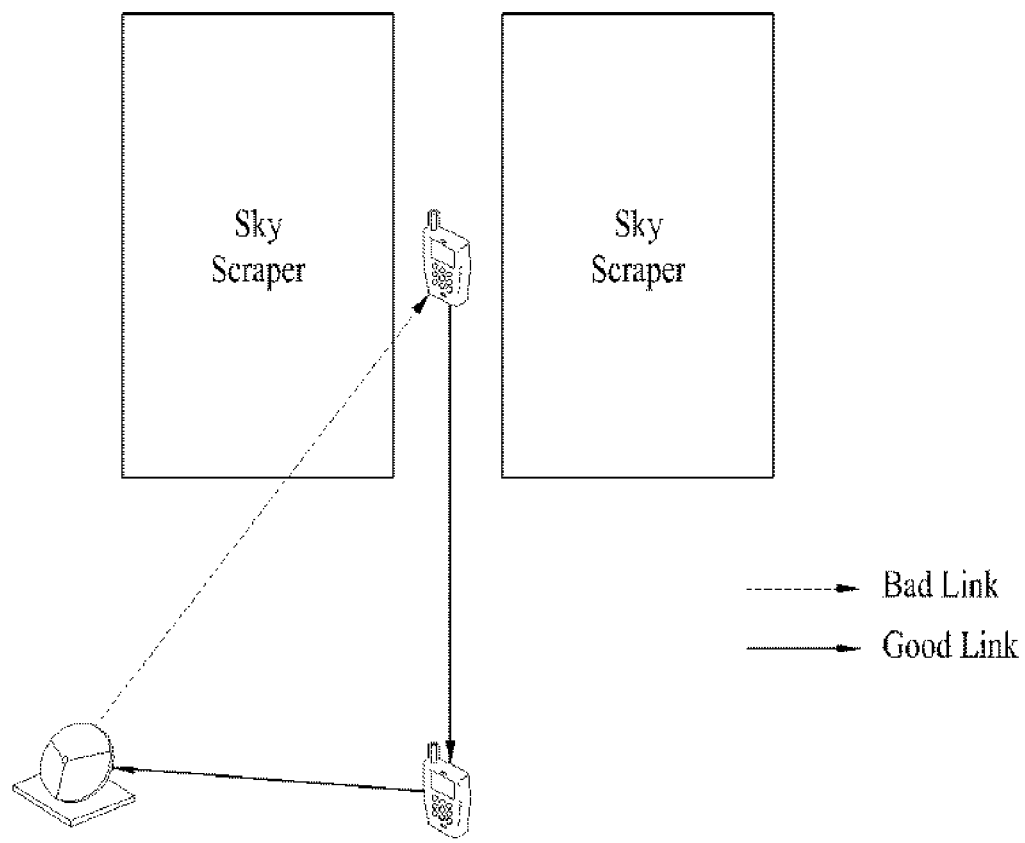
FIGS. 1 to 3 are diagrams showing an M2M communication example.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMax), IEEE 802-20, and E-UTRA (Evolved UTRA). The UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE? Advanced (LTE-A) is an evolved version of 3GPP LTE.

For clarity, the following description focuses on 3GPP LTE and LTE-A. However, technical features of the present invention are not limited thereto.

1. Communication Between MSs

In the present invention, direct communication between MSs refers to a method of directly performing communication between MSs without a base station (BS) in a state in which a channel state between two or more MSs is good or MSs are adjacent. At this time, MSs exchanges data through direct communication. However, communication between MSs in the present invention is different from Bluetooth communication, infrared communication, etc., in which data is exchanged between MSs without a BS, in that the BS provides predetermined control information for communication between MSs. In case of client cooperative communication, an MS B which assists communication of another MS receives data which will be transmitted from an MS A to a BS and transmits the data to the BS or receives data which will be transmitted from the BS to the MS A and transmits the data to the MS A. At this time, one-way communication or two-way communication between MSs is performed within a system bandwidth. Accordingly, client cooperative communication may be regarded as an example of communication between MSs. Client cooperative communication may be applied to uplink transmission through cooperation between MSs and downlink transmission through cooperation between a BS and an MS, cooperation between BSs or cooperation between antennas of a distributed antenna system (DAS).

As described above, the MS A generally exchanges data and/or control information with the BS through the MS B and, in some cases, the MS A may directly exchange data and/or control information with the BS. That is, in consideration of a channel state between the MS A and the BS and a channel state between the MS A and the MS B, the MS A may directly exchange data with the BS. At this time, data and/or control information which is directly exchanged between the MS A and the BS may be equal to or different from data and/or control information which is exchanged between the MS A and the BS through the MS B.

The radio communication system may simultaneously support direct communication and client cooperative communication or support only one of direct communication and client cooperative communication. If the radio communication system simultaneously supports direct communication and client cooperative communication, messages requesting direction communication and client cooperative communication may be different from or equal to each other. If the same message is used, a direct communication request and a client cooperative communication request may be distinguished by a 1-bit indicator. Hereinafter, direct communication between MSs or client cooperative communication is collectively referred to MS-to-MS (M2M) communication.

In the present invention, a source MS refers to an MS which requests M2M communication, an MS which communicates with a BS by the aid of another MS, or an MS which receives a request for communication with a BS from the BS by the aid of another MS. In addition, in the present invention, a partner MS refers to an MS which receives a request for M2M communication from a source MS or a BS or an MS which assists communication between a source MS and a BS. That is, one MS may be a source MS or a partner MS according to roles. A BS may decide that a certain MS functions as a source MS or a partner MS according to circumstance.

In the present invention, all nodes except for an MS are collectively referred to as a BS. For example, a relay node and an antenna node of a DAS may be collectively referred to as a BS because they are access points for accessing the BS. Accordingly, in the embodiments of the present invention, communication between a BS and an MS through a relay node may be regarded as communication between a BS and an MS participating in M2M communication.

1.1. M2M Communication Example

Figure 2:
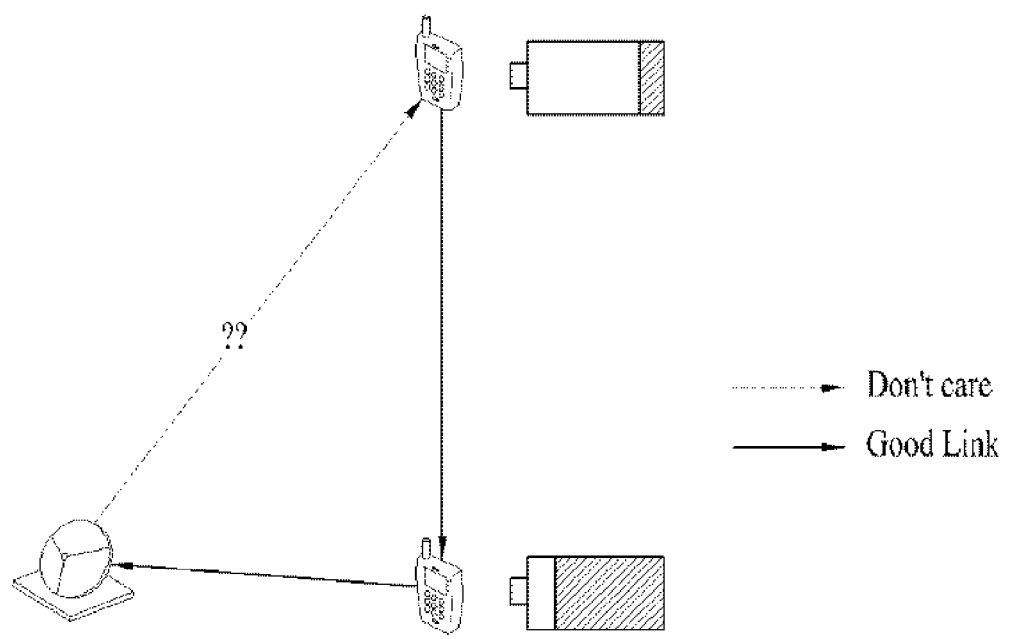
Figure 3:
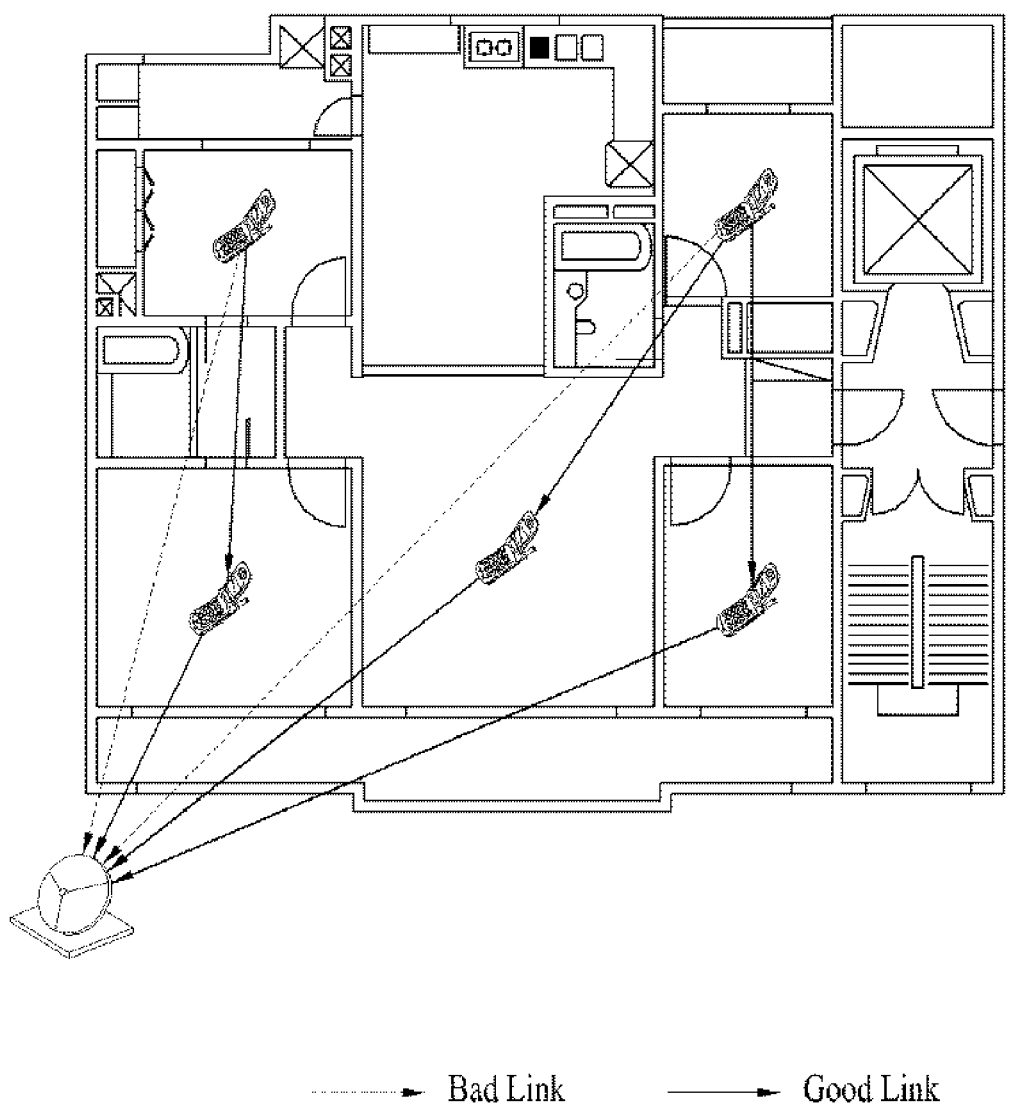

FIGS. 1 to 3 are diagrams showing an M2M communication example.

If propagation loss between a source MS and a BS is large or channel quality is equal to or less than a predetermined level, M2M communication may be triggered. For example, referring to FIG. 1, if the source MS is located between skyscrapers and thus there is no line of sight (LOS) between the source MS and the BS and/or if large penetration loss occurs and thus a channel state between the source MS and the BS is bad, M2M communication may be initiated.

In addition, regardless of the channel state between the source MS and the BS, in order to increase a communicable time and/or decrease a communication latency time of the source MS, M2M communication may be initiated. For example, referring to FIG. 2, the source MS initiates M2M communication, thereby increasing the communicable time and/or decreasing communication latency time even when the remaining battery time is small.

In addition, for high-rate transmission or in an emergency, even when a user of the source MS wishes to perform M2M communication, M2M communication may be initiated. For example, referring to FIG. 3, if a plurality of MSs is located indoors, since a channel state may be changed according to the location of the MS, the source MS may improve data throughput or increase data reception quality through M2M communication. In addition, even when the channel state between the source MS and the BS is not bad, M2M communication may be initiated in order to improve a data transfer rate.

M2M communication may be initiated by a request of the source MS or a request of the BS. In either case, the source MS must receive a partner MS selected by the BS in order to perform M2M communication. A series of processes of requesting M2M communication by the source MS or the BS and allocating the partner MS to the source MS is referred to as an M2M initiation process. The partner MS which performs M2M communication together with the source MS must have a good channel state with the source MS and a good channel state with the BS. In order to enable the BS to select a partner MS for a specific MS, channel quality and/or interference information between the source MS and peripheral MSs of the source MS and channel quality and/or interference information between the BS and peripheral MSs are necessary. That is, the BS requires channel measurement information of the peripheral MSs of the source MS, the battery states of the peripheral MSs, information indicating whether each peripheral MS performs M2M communication with another MS and/or radio resource state information. In the M2M initiation process, channel information between the source MS and the peripheral MSs and state information of the peripheral MSs need to be collected.

1.2. M2M Communication Initiation Process

Hereinafter, embodiments of the present invention of collecting the channel information of the peripheral MSs and state information of the peripheral MSs will be described. Although collection of the channel information of the peripheral MSs is described in the present invention, the state information of the peripheral MSs may also be collected in a same manner. In addition, since the following M2M communication initiation methods are independent, the BS and the source MS may initiate M2M communication using any one of the following methods.

1.2.1. First M2M Communication Initiation Scheme (Source MS Collects Channel Information)

Figure 4:
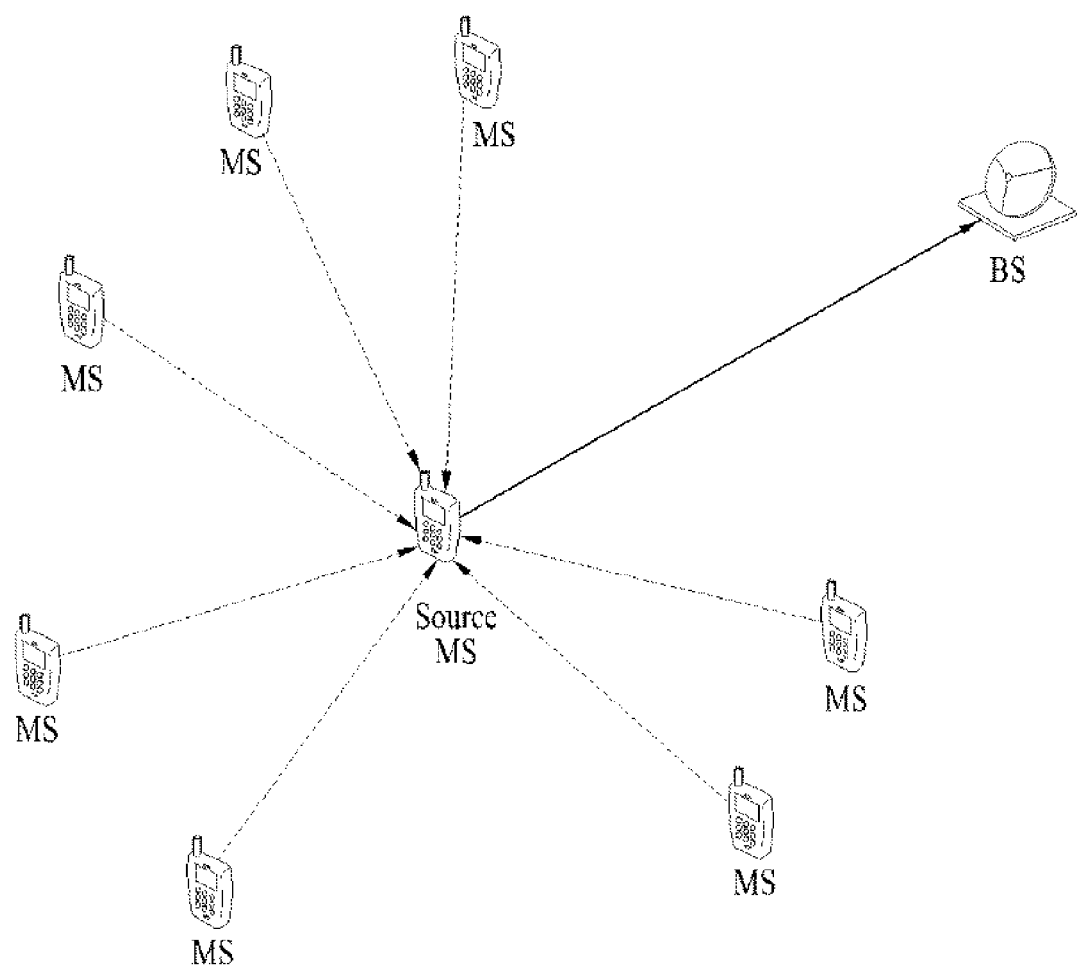
FIG. 4 is a diagram showing a first M2M communication initiation scheme for collecting channel information and/or state information of peripheral mobile stations (MSs) of a source MS.

FIG. 4 is a diagram showing a first M2M communication initiation scheme for collecting channel information and/or state information of peripheral MSs of a source MS.

Referring to FIG. 4, by the first scheme for collecting information about the peripheral MSs for M2M communication, the source MS collects measurement information of the peripheral MSs and transmits the measurement information to a destination BS. In FIG. 4, a dotted line indicates transmission of a reference signal (RS) for channel quality/state estimation and a solid line indicates transmission of the channel quality/state estimation result to the destination BS. If channel information between the source MS and the peripheral MSs is collected using the scheme of FIG. 4, since only the source MS transmits the channel information to the BS, additional resources do not need to be allocated to the peripheral MSs.

Hereinafter, methods of the first scheme for collecting the channel information of the peripheral MSs by the source MS will be described. Since the following methods are independent, the BS and the source MS may initiate M2M communication using any one of the following methods.

FIGS. 5 to 9 are diagrams showing an M2M communication initiation process according to the scheme of FIG. 4. In FIGS. 5 to 9, the same reference numerals denote the same operations. In FIGS. 5 to 9, it is noted that operations corresponding to reference numerals which are present in other figures but are not present in a corresponding figure are not performed in the embodiment of the corresponding figure.

Referring to FIGS. 5 to 9, the source MS may decide M2M communication and request M2M communication initiation from the BS (S500). That is, M2M communication may be initiated by the source MS. Alternatively, the BS may decide M2M communication of the source MS and request M2M communication initiation to the source MS (S500). That is, M2M communication may be initiated by the BS.

Figure 5:
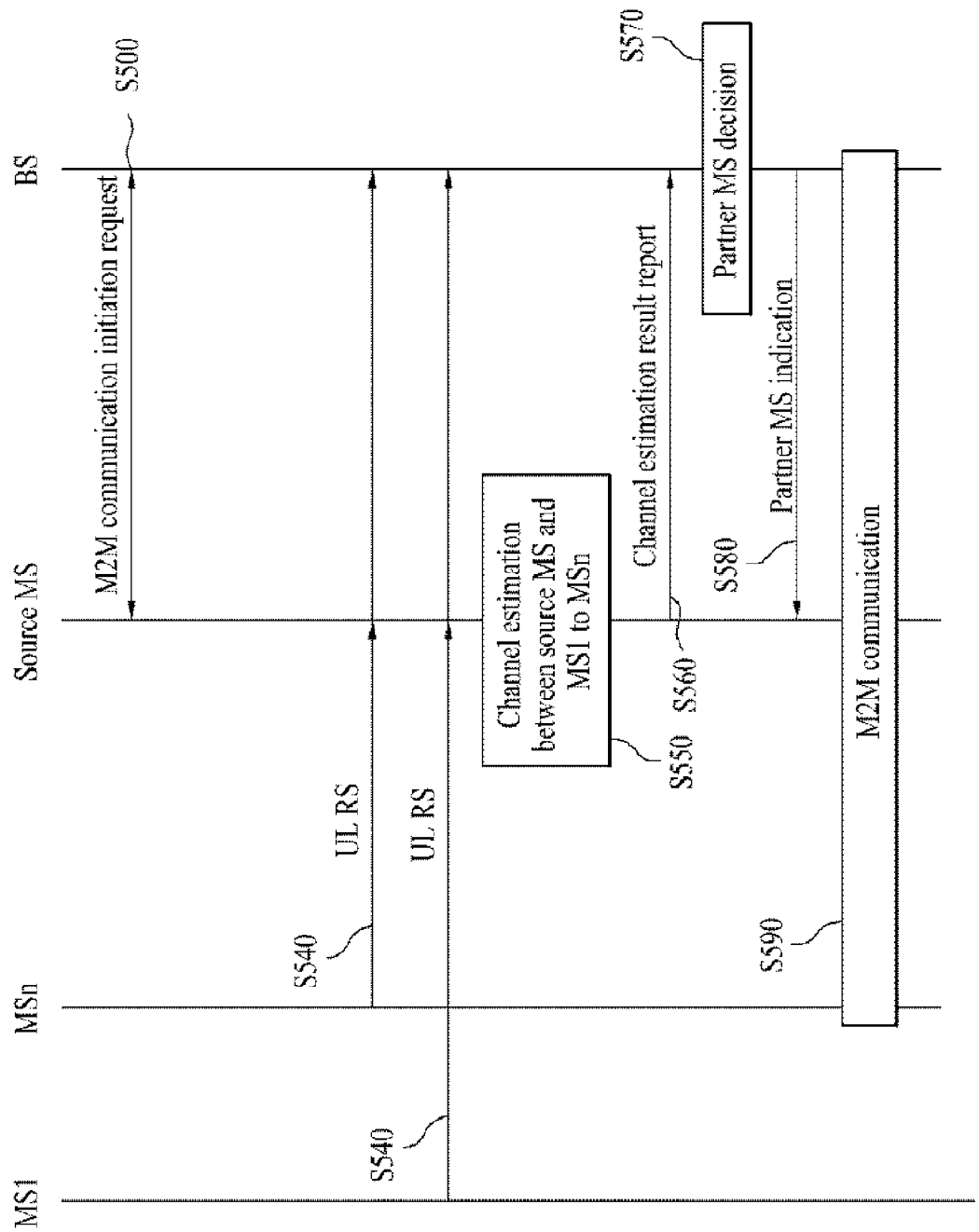
FIGS. 5 to 9 are diagrams showing an M2M communication initiation process according to the scheme of FIG. 4.

Referring to FIG. 5, the source MS receives an uplink reference signal transmitted from peripheral MSs located near the source MS to the BS and/or the source MS for channel estimation between the peripheral MSs and the BS and collects channel information of the peripheral MSs (S540). Here, the reference signal refers to a signal having a special waveform, which is transmitted from a BS to an MS or from an MS to a BS and is predefined between the BS and the MS. Examples of the reference signal may include a pilot, a preamble, a sounding channel, a random access preamble used for initial or periodic ranging, etc.

The BS may inform the source MS of information (hereinafter, referred to as a "CC-MS list") about MSs which are located near the source MS and may perform direct communication or may assist client cooperative communication (S510 of FIGS. 6, 7 and 9). The BS may configure the CC-MS list based on a location based service (LBS) such as global positioning system (GPS), a paging group, etc.

Figure 6:
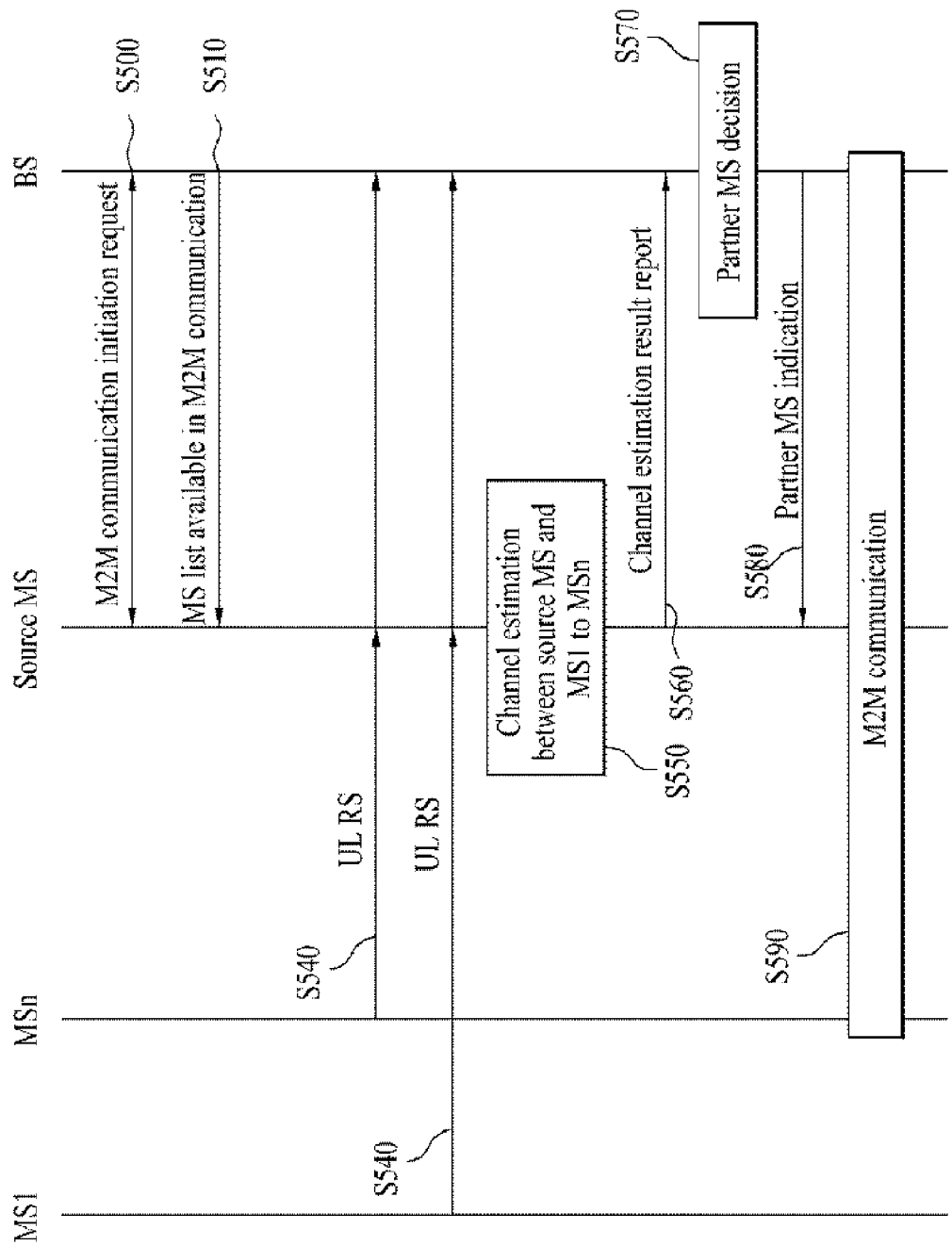

Referring to FIG. 6, the source MS may receive an uplink reference signal transmitted by MSs included in the CC-MS list among uplink reference signals transmitted by the peripheral MSs and collect channel information of the MSs included in the CC-MS list (S540 of FIG. 6).

Figure 7:
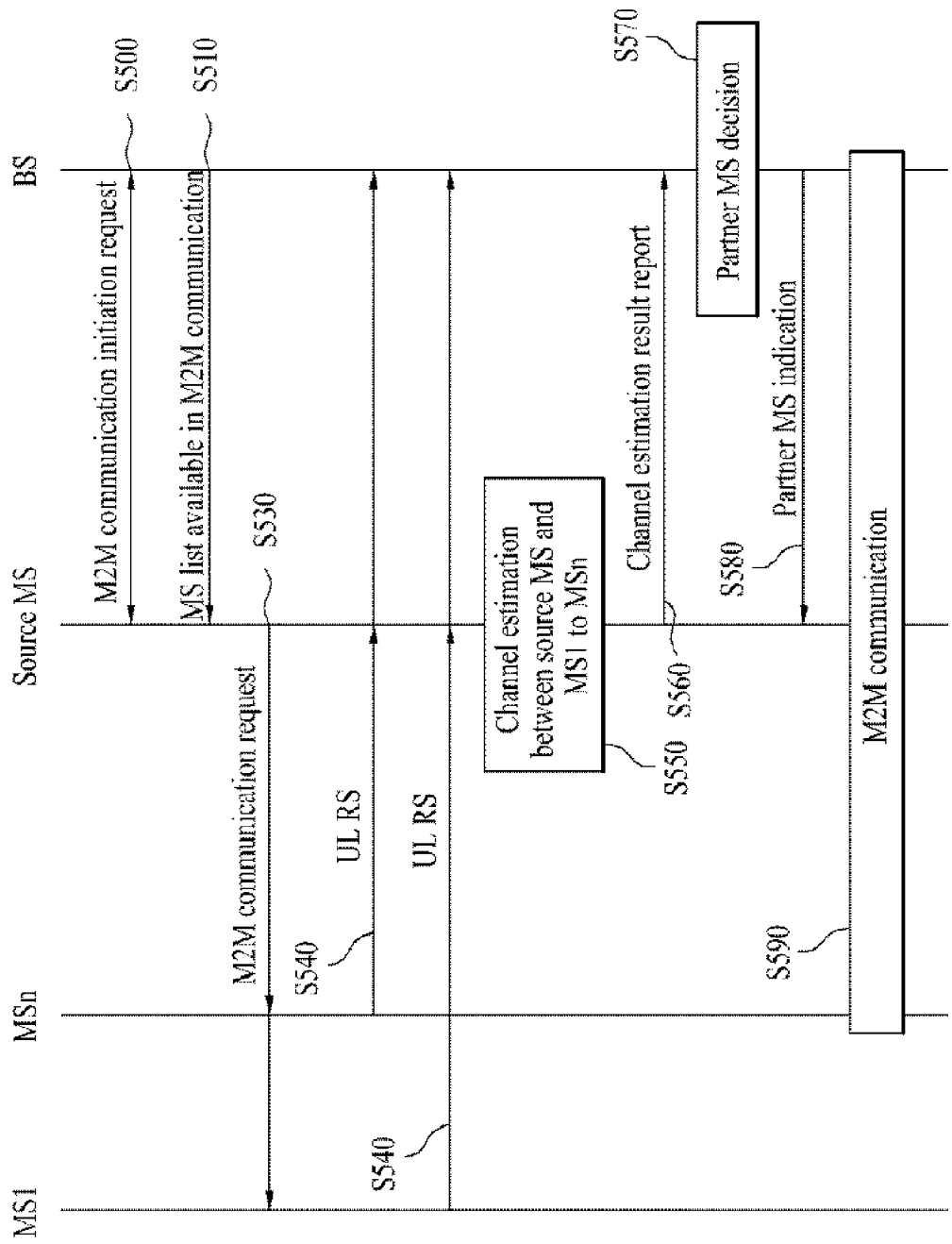

In addition, referring to FIG. 7, the source MS transmits a message requesting M2M communication to the peripheral MSs of the source MS based on the CC-MS list received from the BS (S530 of FIG. 7) and receives uplink reference signals from the peripheral MSs in response thereto, thereby collecting the channel information of the peripheral MSs in the CC-MS list (S540 of FIG. 7).

Figure 8:
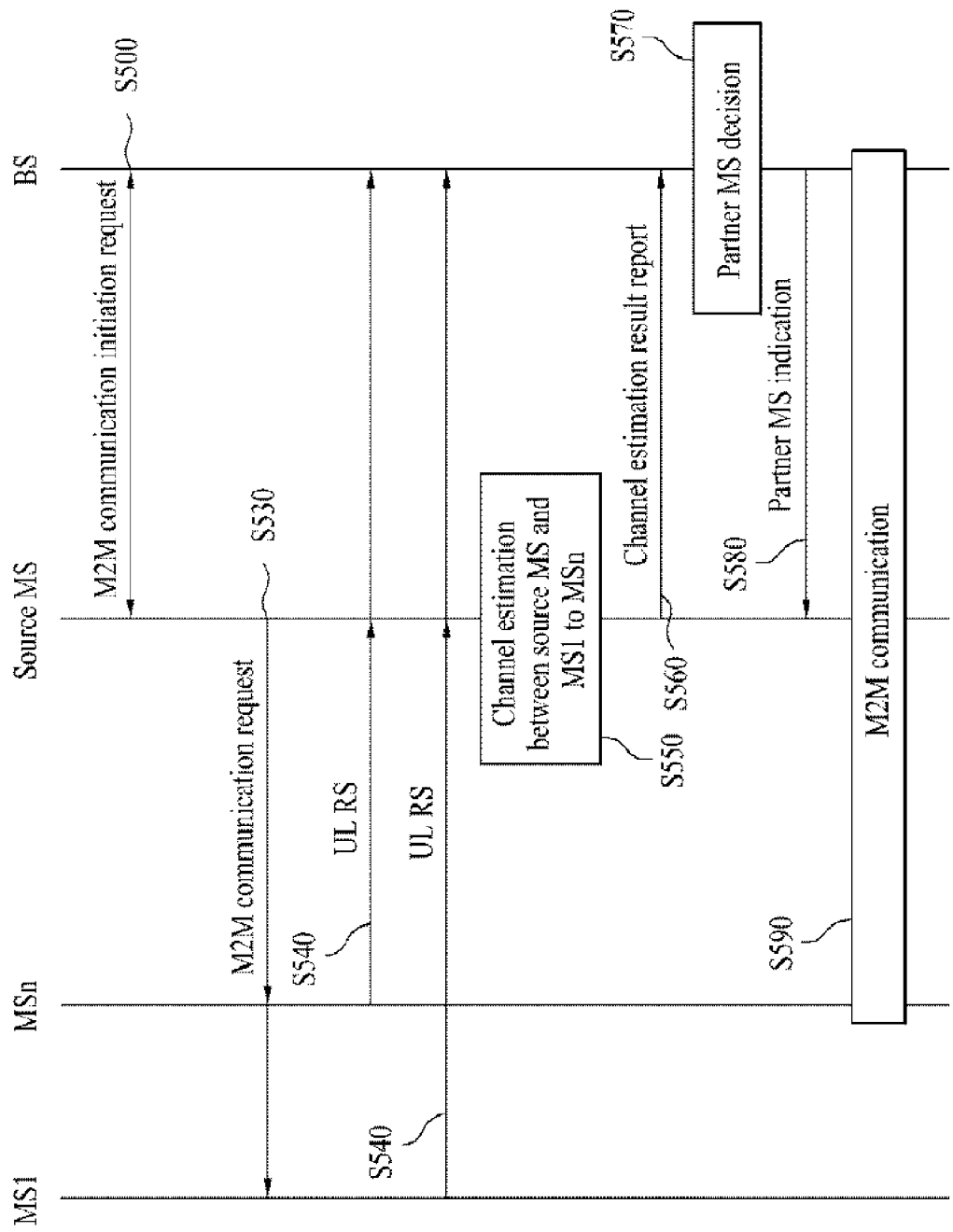

Referring to FIG. 8, the source MS transmits a message requesting M2M communication to the peripheral MSs regardless of the CC-MS list (S530 of FIG. 8) and receives uplink reference signals from the peripheral MSs in response thereto, thereby collecting the channel information of the peripheral MSs (S540 of FIG. 8).

Figure 9:
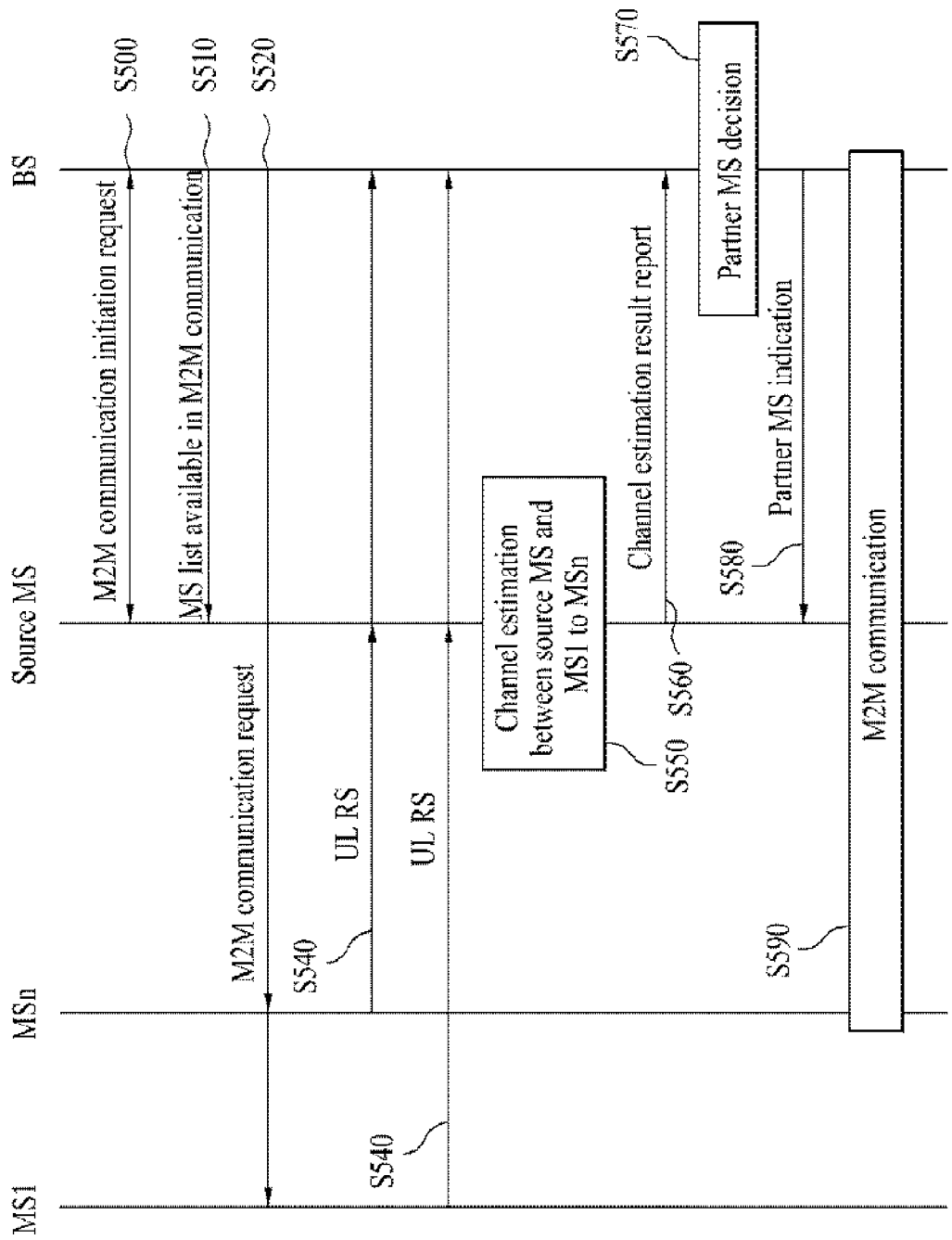

Referring to FIG. 9, the BS may transmit a message requesting M2M communication with the source MS to the peripheral MSs included in the CC-MS list based on the CC-MS list (S530 of FIG. 9) and the source MS receives uplink reference signals from the peripheral MSs in response thereto, thereby collecting the channel information of the peripheral MSs (S540 of FIG. 9).

Referring to FIGS. 5 to 9, the source MS operates in a mode for receiving signals of the peripheral MSs in an uplink portion of a general frame in order to receive the uplink reference signals from the peripheral MSs. For example, the source MS may replace an uplink subframe including symbols, on which the uplink reference signals are transmitted, with a downlink subframe and receive the uplink reference signals from the peripheral MSs in the downlink subframe.

In general, a frame used in a radio communication system includes a predetermined number of subframes. For example, in a 3GPP LTE-A system, each radio frame having a length of 10 ms may include 10 subframes having the same size. In IEEE 802.16m, a radio frame having a length of 80 ms may include four superframes, each superframe may include four frames, and each frame may include eight subframes. The subframe includes a plurality of orthogonal frequency division multiplexing (OFDM) symbols in a time domain and include a plurality of subcarriers in a frequency domain. The frame is differently configured according to a duplex mode. In a frequency division duplexing (FDD) mode, uplink transmission and downlink transmission are distinguished by frequency and one frame includes only one of an uplink subframe and a downlink subframe. In a time division duplexing (TDD) mode, uplink transmission and downlink transmission are distinguished by time and subframes included in one frame are divided into uplink subframes and downlink subframes.

In the FDD mode, the source MS replaces an overall uplink frequency bandwidth or a bandwidth, in which the uplink reference signal is transmitted, of the uplink frequency bandwidth with a downlink frequency bandwidth and receives the uplink reference signal(s) of the peripheral MS(s) in the replaced frequency bandwidth.

In the TDD mode, the source MS replaces all uplink subframes among a plurality of subframes configuring one frame or some of the subframes including symbols, on which the uplink reference signals are transmitted, with downlink subframes and receives the uplink reference signal(s) of the peripheral MS(s) in the replaced time portion.

In the TDD mode, a predetermined idle time is present while the uplink is changed to the downlink or the downlink is changed to the uplink and is referred to as a transition time (TT).

A reference signal is generally transmitted at a predetermined position such that a receiver can easily detect the reference signal. The source MS which operates in the TDD mode replaces all or some uplink subframes including symbols, on which the uplink reference signals are transmitted, with downlink subframes and defines the uplink reference signals to be transmitted on a middle portion of the subframes so as to configure a radio frame such that a sufficient TT is ensured in the front side and the back side of the uplink reference signals in the replaced portion. Alternatively, the idle time or the TT of the conventional frame structure may be used as a portion for receiving the uplink reference signals of the peripheral MSs, in order to minimize throughput loss of the source MS generated in the process of collecting the information about the peripheral MSs. For example, if an uplink reference signal is defined to be transmitted on a first symbol or a last symbol of an uplink transmission portion composed of one or more uplink subframes, the source MS, which is switched to the downlink mode in order to receive the reference signals of the peripheral MSs, continues to operate in the downlink mode without being switched to the uplink mode and then being switched to the downlink mode. Thus, it is possible to reduce the TT.

The source MS measures the inter-MS channel states between the source MS and the peripheral MSs based on the uplink reference signals of the peripheral MSs (S550). Hereinafter, information associated with the channel states between the peripheral MSs and the source MS, which are measured by the source MS based on the uplink reference signals of the peripheral MSs, is collectively referred to as a "channel estimation result".

The source MS may set MSs having a good channel state as a partner MS candidate group based on the result of measuring the inter-MS channel states between the source MS and the peripheral MSs and transmit the channel estimation result of the partner MS candidate group to a destination BS (S560). Alternatively, the measured channel estimation result of all the peripheral MSs may be transmitted to the destination BS. Alternatively, an MS identifier (ID) of a peripheral MS selected by the source MS or information capable of estimating an MS ID may be transmitted to the BS.

As the M2M communication reference signal used by the source MS to measure the inter-MS channel states between the source MS and the peripheral MSs, the uplink reference signal which was transmitted to the BS when the MS estimates the channel state between the BS and the MS may be used. Alternatively, for M2M communication, a separate M2M communication reference signal may be defined.

In order to enable the source MS to distinguish between the M2M communication reference signals received from the peripheral MSs, the M2M communication reference signals may be defined such that MS IDs are distinguished through masking using the MS ID. By masking using the MS ID, the MSs may not be easily distinguished. In this case, the M2M communication reference signals may be designed such that the MS IDs are distinguished even among the number of MSs included in the CC-MS list or a predetermined number of MSs. The source MS and the peripheral MSs may receive information indicating the M2M communication reference signal corresponding to a predetermined number of MSs from the BS or the source MS. The peripheral MSs may transmit an M2M communication reference signal pattern based on information capable of identifying the M2M communication reference signals and the source MS may distinguish between the peripheral MSs based on information capable of identifying the M2M communication reference signal. In this case, the BS may transmit information indicating a region in which the M2M communication reference signal is transmitted to the MSs using a broadcast/multicast scheme such that the source MS can detect the M2M communication reference signals of the peripheral MSs in a predetermined time/frequency region. In addition, a plurality of reference signal patterns may be defined such that the reference signals of a predetermined number of MSs are distinguished in a time domain and/or a frequency domain.

Information identifying the peripheral MSs selected by the source MS may be indirectly signaled to the BS by transmitting resource information such as time/frequency/code, using which the reference signals of the peripheral MSs are detected, from the source MS to the BS. The BS may identify the peripheral MSs selected by the source MS based on resource information. In this case, the BS may transmit, to the source MS, signal system information capable of analyzing a signal having a predetermined structure in a system which is expected to be used by the peripheral MSs or a system used by the peripheral MSs. The source MS may detect the reference signals of the peripheral MSs based on the signal system information and transmit information indicating resources, using which the reference signals of the peripheral MSs are detected, to the BS along with the channel state information between the peripheral MSs and the source MS measured based on the reference signals of the peripheral MSs.

The BS may decide a partner MS which will perform M2M communication with the source MS among the peripheral MSs based on the channel states between the source MS and the peripheral MSs, which are received from the source MS, and the channel states between the peripheral MSs and the BS, which are known to the BS (S570).

The BS may estimate the channel states between the BS and the peripheral MSs based on the uplink reference signals of the peripheral MSs. The peripheral MSs may transmit the uplink reference signals for estimation of the channel states between the peripheral MSs and the BS, which are masked with MS IDs thereof, to the BS, in order to enable the BS or another peripheral/source MS to identify the MS which transmits the uplink reference signal. Alternatively, the BS may identify the channel states between the BS and the peripheral MSs, based on a value fed back to the BS as the result of estimating the channel states between the peripheral MSs and the BS by the peripheral MSs based on the downlink reference signal for channel estimation transmitted by the BS. The BS may further consider the amount of resources usable by the peripheral MS and the remaining battery time of the peripheral MS, in order to decide the partner MS.

The BS notifies the source MS and/or the partner MS of information indicating the partner MS decided in step S570 (S580). Alternatively, if the BS notifies the source MS of the partner MS, the source MS may notify the designated partner MS that the corresponding MS is designated as the partner MS of M2M communication. Subsequently, the source MS performs M2M communication with the partner MS (S590). As described above, M2M communication may be direct communication in which the source MS and the partner MS directly exchange user data with each other. In addition, M2M communication may be client cooperative communication in which the partner MS receives uplink data of the source MS and transmits the uplink data to the BS or receives downlink data from the BS and transmits the downlink data to the source MS.

The source MS may detect energies of signals transmitted from the peripheral MSs to the BS (signals transmitted from the BS to the peripheral MSs) during a specific time period and transmit information indicating the peripheral MSs and an order of detected energies as the channel estimation result (S560). The BS which receives the channel estimation result may detect peripheral MSs which utilize channels capable of enabling the source MS to receive a signal with high energy using the order of detected energies. The BS may estimate interference of a corresponding channel using power control associated parameters used for the peripheral MSs and/or a modulation and coding scheme (MCS) level and decide a peripheral MS (e.g., MSn) which utilizes a region capable of enabling the source MS to receive a signal with high energy even in a state of excluding interference as a partner MS (S570). Alternatively, transmission efficiencies of all channels from the source MS to the peripheral MSs and from the peripheral MSs to the BS may be calculated and a peripheral MS (e.g., MSn) capable of most efficiently performing transmission may be decided as a partner MS.

1.2.2. Second M2M Communication Initiation Scheme (Peripheral MSs Collect Channel Information)

Figure 10:
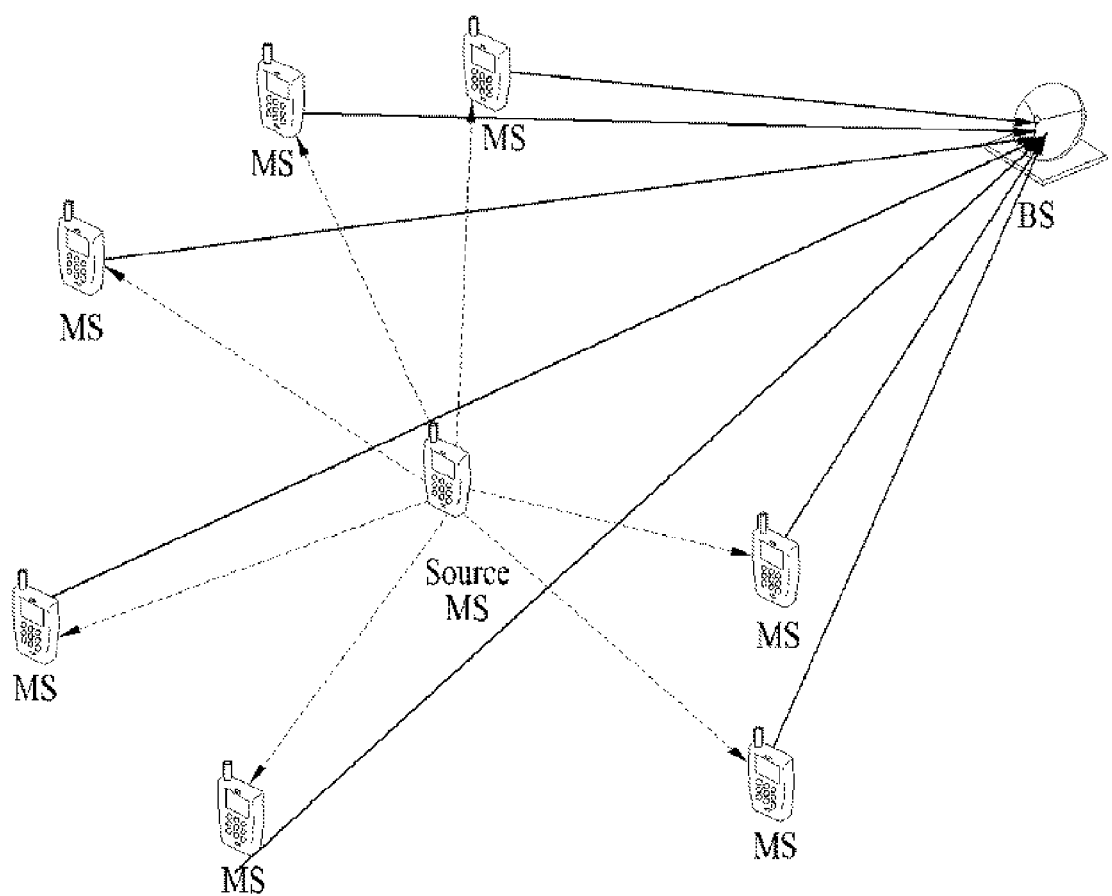
FIG. 10 is a diagram showing a second M2M communication initiation scheme for collecting channel information and/or state information of peripheral MSs of a source MS.

FIG. 10 is a diagram showing a second M2M communication initiation scheme for collecting channel information and/or state information of peripheral MSs of a source MS.

Unlike the first scheme for collecting the channel state information of the peripheral MSs by the source MS, in the second scheme, the peripheral MSs collect the channel state information between the peripheral MSs and the source MS. In FIG. 10, a dotted line indicates transmission of a reference signal for channel quality/state estimation and a solid line indicates transmission of the channel quality/state estimation result to the destination BS. If channel information between the source MS and the peripheral MSs is collected using the scheme of FIG. 10, since the source MS needs to know only an MS to be decided as a partner MS, security risks such as personal information leakage generated when information about the MS is shared between the source MS and the peripheral MSs can be decreased. This is particularly advantageous in the embodiments in which M2M communication is performed without providing the CC-MS list to the source MS.

Hereinafter, methods of the second scheme for collecting the channel information between the source MS and the peripheral MSs by the peripheral MSs will be described. Since the following methods are independent, the BS and the source MS may initiate M2M communication using any one of the following methods.

FIGS. 11 to 16 are diagrams showing an M2M communication initiation process according to the scheme of FIG. 10. In FIGS. 11 to 16, the same reference numerals denote the same operations. In FIGS. 11 to 16, it is noted that operations corresponding to reference numerals which are present in other figures but are not present in a corresponding figure are not performed in the embodiment of the corresponding figure.

Referring to FIGS. 11 to 16, the source MS may decide M2M communication and request M2M communication initiation from the BS (S1100). That is, M2M communication may be initiated by the source MS. Alternatively, the BS may decide M2M communication of the source MS and request M2M communication to the source MS (S1100). That is, M2M communication may be initiated by the BS.

The MSs which collect the channel information for M2M communication may be decided without restriction, or may be restricted to MSs belonging to a specific group (e.g., an MS group supporting M2M communication). As the MSs of the specific group, MSs which are expected to be located near the source MS based on an LBS, a paging group, etc. may be selected. The BS may provide a list ("CC-MS list") of the MSs belonging to the specific group to the source MS so as to prevent peripheral MSs which cannot become partner MSs from participating in the M2M communication initiation process.

Figure 11:
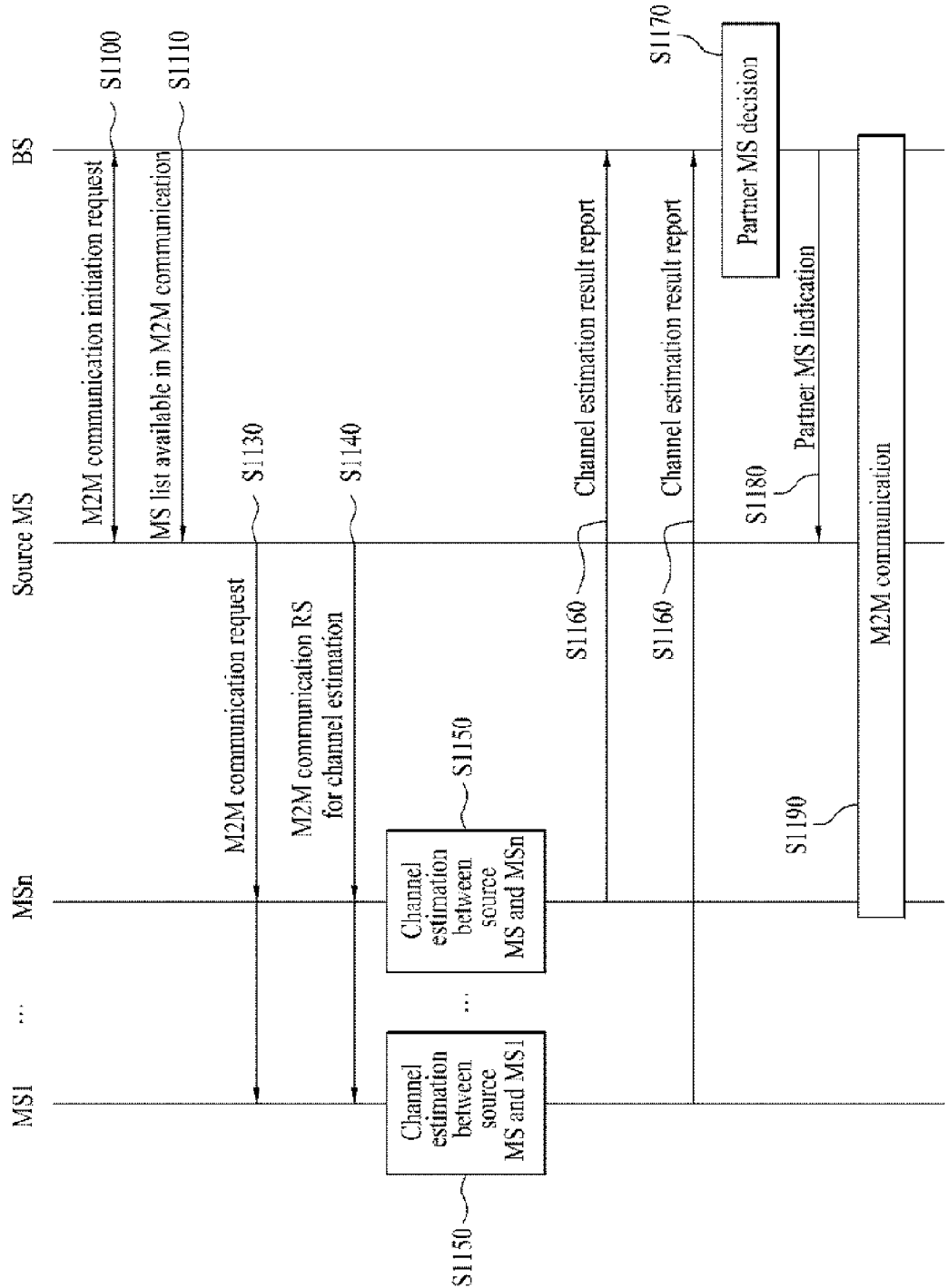
FIGS. 11 to 16 are diagrams showing an M2M communication initiation process according to the scheme of FIG. 10.
Figure 12:
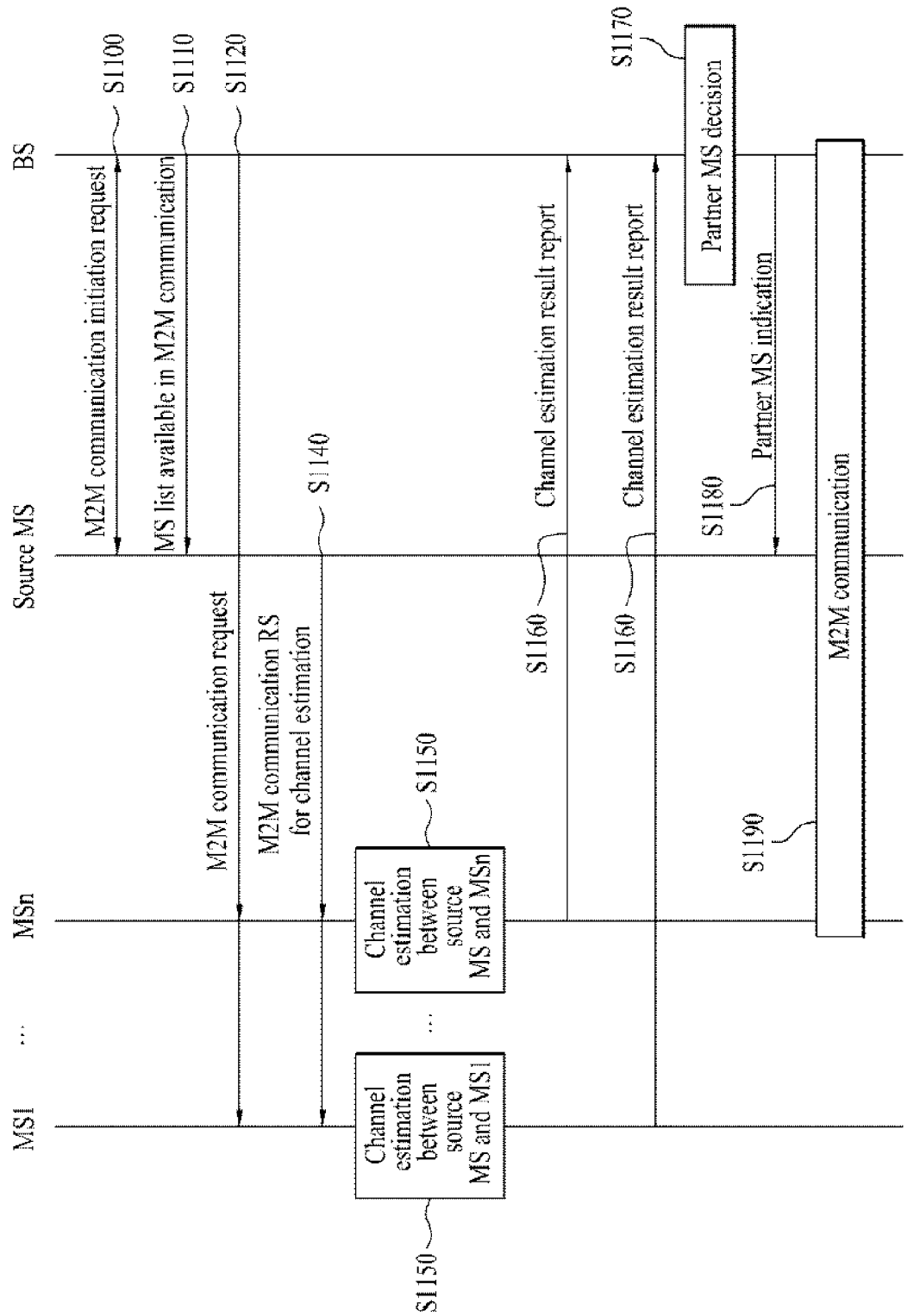
Figure 13:
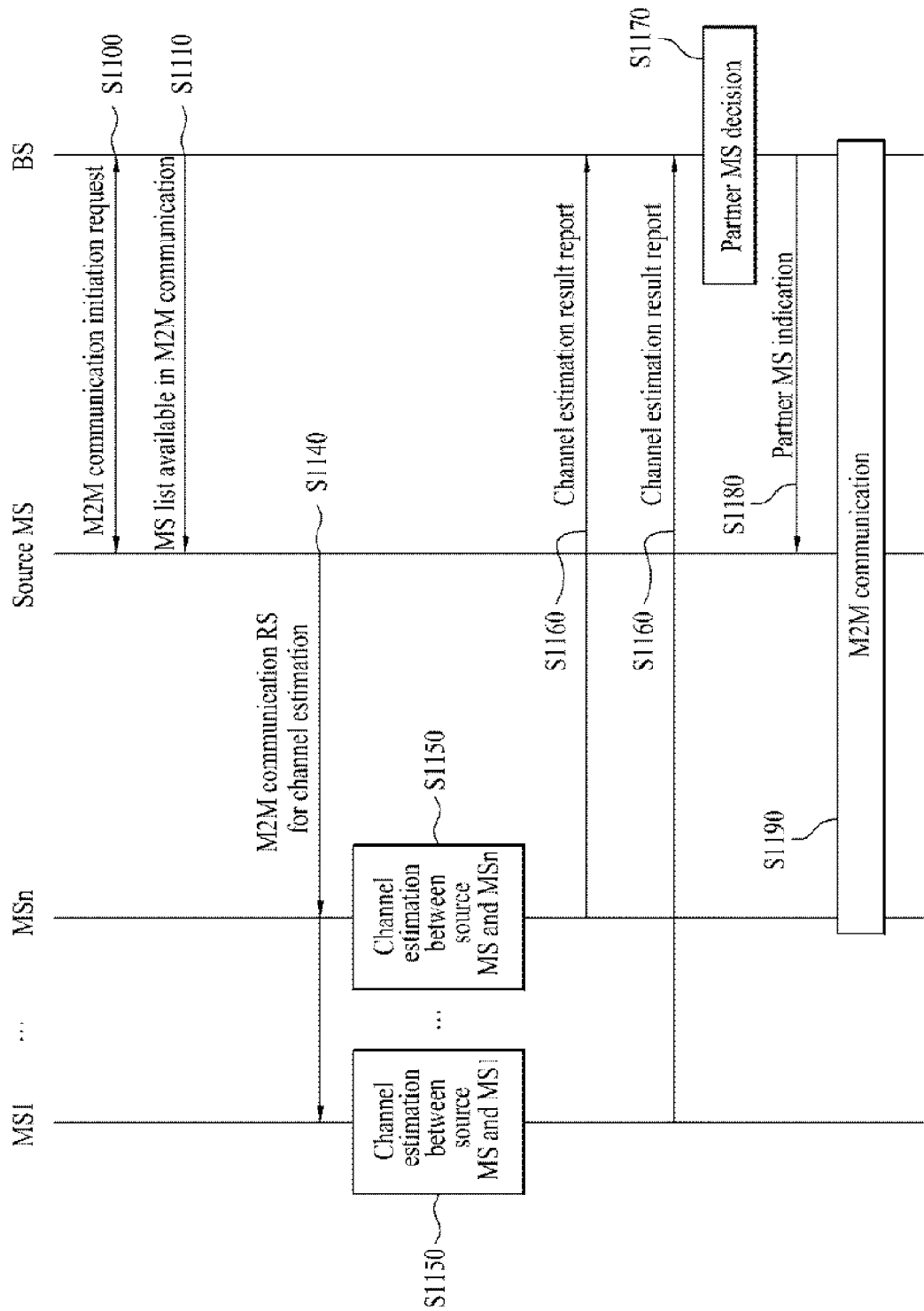

For example, referring to FIGS. 11 to 13, the BS may inform the source MS of the CC-MS list which is information about the MSs which are located near the source MS and may perform direct communication or may assist client cooperative communication (S1110 of FIGS. 11 to 13).

Referring to FIG. 11, the source MS may transmit a message requesting M2M communication to the peripheral MSs of the source MS based on the CC-MS list (S1130 of FIG. 11) and transmit an M2M communication reference signal for channel estimation (hereinafter referred to as an M2M communication reference signal) to the peripheral MSs (S1140 of FIG. 11).

Referring to FIG. 12, the BS may transmit a message requesting M2M communication to the peripheral MSs of the source MS based on the CC-MS list (S1120 of FIG. 12) and the source MS may transmit an M2M communication reference signal to the peripheral MSs based on the CC-MS list received from the BS (S1140 of FIG. 12).

Referring to FIG. 13, the source MS may transmit an M2M communication reference signal to the peripheral MSs of the source MS based on the CC-MS list so as to request M2M communication (S1140 of FIG. 13).

Figure 14:
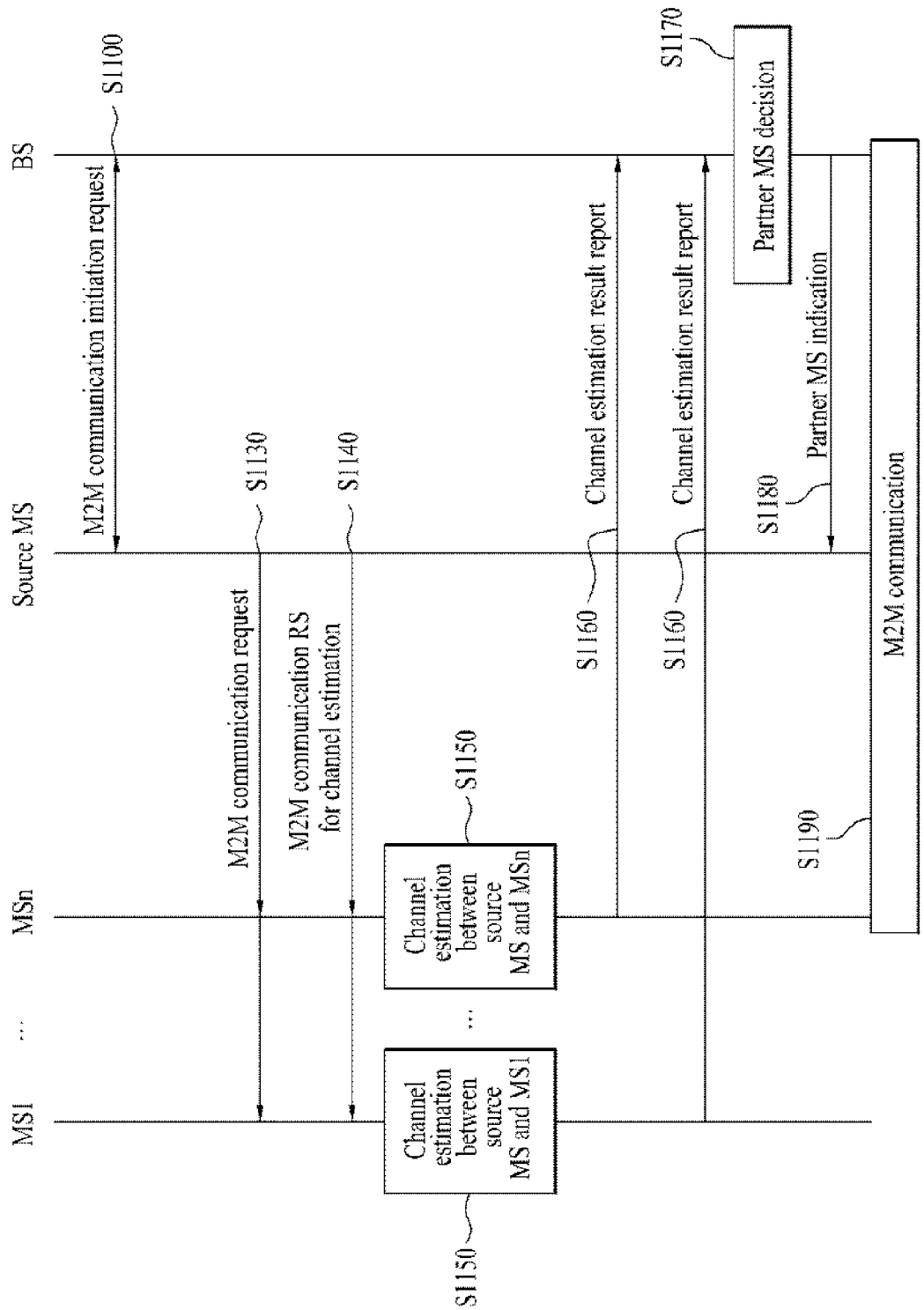
Figure 15:
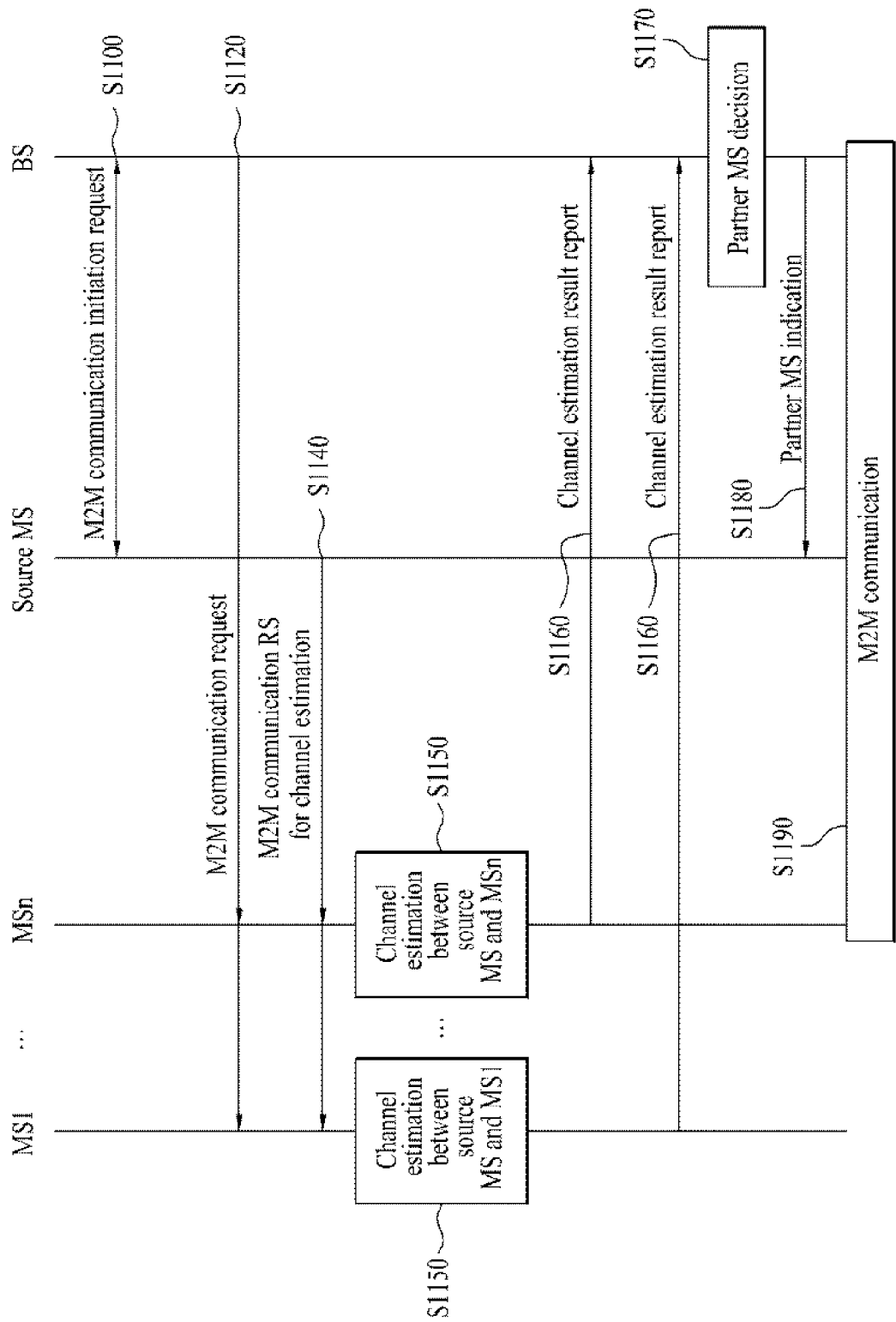
Figure 16:
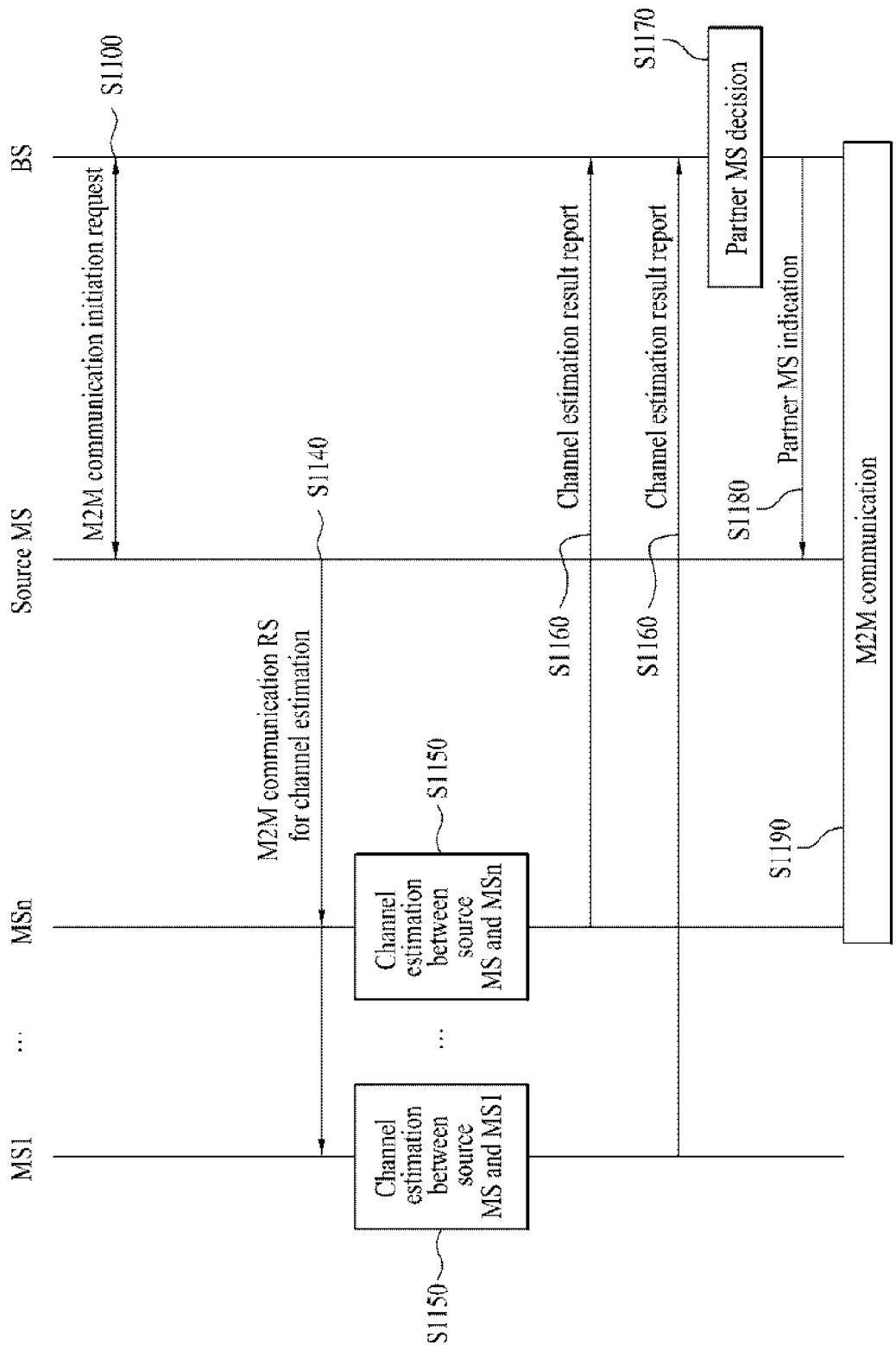

Referring FIGS. 14 to 16, as described above, MSs which collect channel information for M2M communication may be set without a special restriction. That is, the BS may not provide the CC-MS list to the source MS.

Referring to FIG. 14, the source MS may transmit an M2M communication request message and an M2M communication reference signal to MSs which are expected to be located in a predetermined peripheral region of the source MS (S1130 and S1140 of FIG. 14). In this case, the MSs which receive the M2M communication request message and the M2M communication reference signal may be restricted to MSs belonging to a previously set group (e.g., a group of MSs capable of supporting and executing M2M communication).

Referring to FIG. 15, the BS may not transmit a CC-MS list to the source MS but may transmit an M2M communication message to the peripheral MSs of the source MS in the CC-MS list (S1120 of FIG. 15) and instruct the peripheral MSs to receive the M2M communication reference signal from the source MS.

Referring to FIG. 16, the source MS may transmit the M2M communication reference signal to certain MS(s) in a predetermined peripheral region of the source MS without transmitting the M2M communication request message (S1140 of FIG. 16).

In order to minimize interference generated in the peripheral MSs due to the M2M communication reference signal transmitted by the source MS, the source MS may gradually increase transmission power of the M2M communication reference signal. That is, the source MS may transmit initially the M2M communication reference signal with transmission power having a minimum value or a predetermined level and may retransmit the M2M communication reference signal with increased transmission power if a feedback is not received from the BS or the peripheral MSs for a predetermined period of time. In addition, if direct communication or client cooperative communication is immediately necessary due to emergency, the source MS may initially transmit the M2M communication reference signal with a value greater than a predetermined power level or a maximum value.

As described above, MSs capable of performing M2M communication among MSs located in a predetermined peripheral region of the source MS may collect channel information for M2M communication as follows.

Referring to FIGS. 11 to 16, the source MS which decides M2M communication or receives a request for M2M communication from the BS transmits a reference signal for channel estimation with peripheral MSs in a predetermined time portion and/or a predetermined frequency portion (S1140). For example, the source MS which operates in a TDD mode transmits an M2M communication reference signal for channel estimation to the peripheral MSs in a downlink (or uplink) time portion and the source MS which operates in a FDD mode transmits an M2M communication reference signal for channel estimation to the peripheral MSs in a downlink (or uplink) bandwidth. If the downlink transmission portion is used to transmit the M2M communication reference signal, the source MS replaces a general downlink portion with an uplink portion for transmitting the reference signal to the peripheral MSs and performs an operation. For example, a downlink subframe including symbols on which the downlink reference signal is transmitted is replaced with an uplink subframe, which may be used as a transmission and transition time of the M2M communication reference signal. The source MS may configure a radio frame such that whole or part of a downlink subframe including symbols, on which the downlink reference signal is transmitted, is replaced with an uplink subframe and the downlink reference signal is transmitted on a middle portion of the subframe, thereby ensuring a sufficient transition time at the front and rear sides of the M2M communication reference signal in the replaced portion. Alternatively, in order to minimize throughput loss of the source MS generated in a process of collecting channel information with the source MS by the peripheral MSs, the time portion including the idle time or the transition time of the existing frame structure may be used as a portion for transmitting the M2M communication reference signal.

For channel estimation between the BS and the source MS, the existing uplink reference signal transmitted by the source MS may be used as the M2M communication reference signal or an M2M communication reference signal may be newly defined.

The BS may allocate a time and/or frequency resource region for transmitting a specific signal (e.g., M2M communication reference signal) to the source MS. Alternatively, the M2M communication reference signal transmitted from the source MS to the BS may be transmitted through a predetermined time and/or frequency resource region (e.g., a separate channel or a random access channel for M2M communication or an M2M communication reference signal). The peripheral MSs capable of performing M2M communication should receive information for receiving the M2M communication reference signal from the source MS, that is, a variety of information (e.g., MCS, MIMO parameter, resource allocation, etc.) associated with a transmission mode from the BS. If the peripheral MS uses an uplink transmission portion in order to receive the M2M communication reference signal, the peripheral MS should operate in a reception mode in an uplink transmission portion in order to receive an uplink reference signal transmitted by the source MS. Therefore, the BS may send control information for controlling an operation between the source MS and the peripheral MS in the downlink of a macro cell. Such control information may include information indicating in which uplink portion the M2M communication reference signal transmitted by the source MS is received, information about at which resource location the M2M communication reference signal is received, MCS or MIMO information associated with the structure of the M2M communication reference signal, etc.

Peripheral MSs capable of performing direct communication or assisting client cooperative communication in a macro cell may detect a signal of the source MS on a resource region allocated to the source MS by the BS for transmission of the M2M communication reference signal and transmits the detected result and/or parameters associated with the detected value to the BS if the power or quality thereof is equal to or greater than a predetermined level.

Referring to FIGS. 11 to 16, peripheral MSs which are implicitly or explicitly requested to participate in M2M communication from the source MS or the BS receive an M2M communication downlink reference signal from the source MS and estimate or measure channel states between the peripheral MSs and the source MS using the M2M communication downlink reference signal (S1150). Subsequently, each peripheral MS transmits the result of estimating or measuring the channel state to the BS (S1160). At this time, only MSs having a good channel state among the peripheral MSs may transmit the results of estimating or measuring the channel states (S1160). In addition, the peripheral MSs which transmit the channel estimation results to the BS may mask the channel estimation results with MS IDs thereof such that the BS identifies the channel estimation results and the MSs corresponding thereto.

The BS may decide a partner MS which will perform M2M communication with the source MS based on the channel states between the source MS and the peripheral MSs reported by the peripheral MSs (S1170). When the BS decides the partner MS, channel states between the BS and the peripheral MSs are considered. The BS may estimate the channel states between the BS and the peripheral MSs based on uplink reference signals of the peripheral MSs. The peripheral MS may mask an uplink reference signal with an MS ID thereof and transmit the uplink reference signal to the BS such that the BS or another peripheral/source MS identifies the MS which transmits the uplink reference signal. Alternatively, the BS may identify the channel states between the BS and the peripheral MSs, based on a value fed back to the BS as the result of estimating the channel states between the peripheral MSs and the BS by the peripheral MSs based on the downlink reference signal for channel estimation transmitted by the BS. The BS may further consider the amount of resources usable by the peripheral MS and the remaining battery time of the peripheral MS, for decision of the partner MS.

The BS notifies the source MS and/or the partner MS of information indicating the partner MS decided in step S1170. For example, the BS may decide MSn as the partner MS and notify the source MS and MSn that MSn is designated as the partner MS. Alternatively, if the BS notifies the source MS of the partner MS, the source MS may notify the designated partner MS that the corresponding MS is designated as the partner MS of M2M communication. Subsequently, the source MS performs M2M communication with the partner MS (S1190). As described above, M2M communication may be direct communication in which the source MS and the partner MS directly exchange user data with each other. In addition, M2M communication may be client cooperative communication in which the partner MS receives uplink data of the source MS and transmits the uplink data to the BS or receives downlink data from the BS and transmits the downlink data to the source MS.

In FIGS. 4 to 16, the BS may decide a plurality of peripheral MS as a partner MS. If a plurality of partner MSs participates in M2M communication with the source MS, how the plurality of partner MSs transmits or receives data to or from the source MS or the BS in a predetermined time and/or frequency region should be defined. If the plurality of partner MS detects the signal transmitted by the source MS and transmits the data to the BS or receives data to be transmitted to the source MS from the BS, since the plurality of partner MSs are located in a coverage in which the BS provides a communication service and is synchronized with the BS, all the plurality of partner MSs can transmit or receive the data of the source MS to or from the BS in the same format. In addition, the BS may set a transmission mode on each partner MS basis such that the plurality of partner MSs may transmit or receive data of the source MS to or from the BS in formats having distinguishable signal characteristics. For example, if the BS performs cooperative transmission with respect to all partner MSs, the BS may control the partner MSs to transmit or receive data of the source MS to or from the BS using the same MCS and the same MIMO mode. As another example, the BS may differently set information about MCS, resources or MIMO mode on each partner MS basis through an explicit or implicit indication based on a predetermined rule. Thus, it is possible to acquire transmit diversity between the BS and the source MS and implement efficient client cooperative communication.

When the BS selects a partner MS according to the embodiments of FIGS. 4 to 16, the BS may further consider the states of the peripheral MSs in addition to the channel states between the source MS and the peripheral MSs and the channel states between the peripheral MSs and the BS. For example, the battery states of the peripheral MSs, whether the peripheral MS is currently performing M2M communication with another MS, a radio resource state, etc. may be considered. In the embodiments of FIGS. 4 to 9, the source MS may collect the state information of the peripheral MSs and transmit the state information to the BS along with the channel information. In the embodiments of FIGS. 10 to 16, the peripheral MSs may transmit the state information thereof to the BS.

As M2M communication is initiated by the above-described method, it is possible to reduce radio resources such as a time and frequency region used in the M2M communication initiation process. In addition, since the BS finally controls M2M communication, it is possible to reduce burden of the MS with relatively low computation performance or weak power. In addition, since separate information for M2M communication is not exchanged in addition to the reference signal in order to estimate channel quality between MSs, it is possible to minimize resource consumption.

2. Handover in M2M Communication

If a source/partner MS participating in M2M has mobility, a link or channel quality between MSs or between an MS and a BS may be changed to be different from that when M2M communication is initiated. Since performance of M2M communication may be deteriorated as compared to when M2M communication is initiated due to a change in link or channel quality, there is a need for handover between MSs or between an MS and a BS even in M2M communication.

2.1 Handover Between Source MS and BS

Handover between a source MS and a BS may be performed equally to handover performed in conventional communication between an MS and a BS (non-cooperative communication, MS-BS single link). Since not only a source MS but also a partner MS has mobility, the source MS may or may not perform handover with the partner MS while performing handover with the BS. If handover between the source MS and the BS is performed, the following two cases may be generated depending on whether handover between the source MS and the partner MS is performed.

2.1.1. Case in which Handover Between MSs is not Performed

Figure 17:
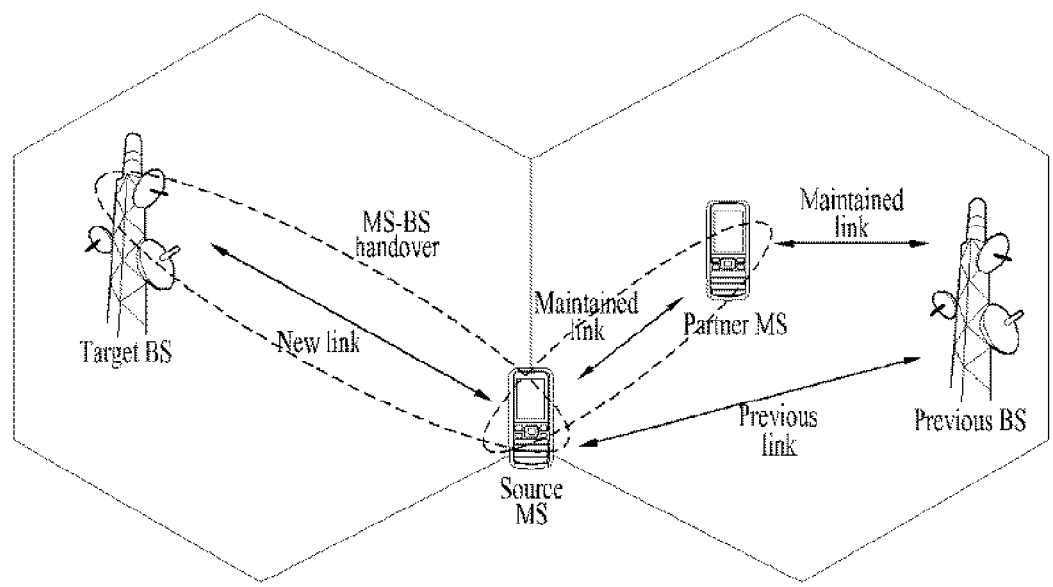
FIGS. 17 and 18 are diagrams showing handover between a source MS and a base station (BS) according to an embodiment of the present invention.

FIG. 17 is a diagram showing handover between a source MS and a BS according to an embodiment of the present invention.

Referring to FIG. 17, the source MS moves from a coverage serviced by a previous BS to a coverage serviced by a target BS. When the source MS moves to the coverage serviced by the target BS, handover from the previous BS to the target BS occurs.

In this case, the source MS may perform M2M communication without changing an old partner MS. That is, if a link or channel quality between the source MS and the old partner MS is maintained at a predetermined level and a link or channel quality between the old partner MS and the BS is maintained at a predetermined level, handover between the source MS and the old partner MS is not performed.

If the source MS performs M2M communication without changing the old partner MS, data transmitted by the source MS in a broadcasting manner may be sent to the handed-over BS (target BS) and the old partner MS, and the partner MS may send the data received from the source MS to the previous BS.

2.1.2. Case in which Handover Between MSs is Performed

Figure 18:
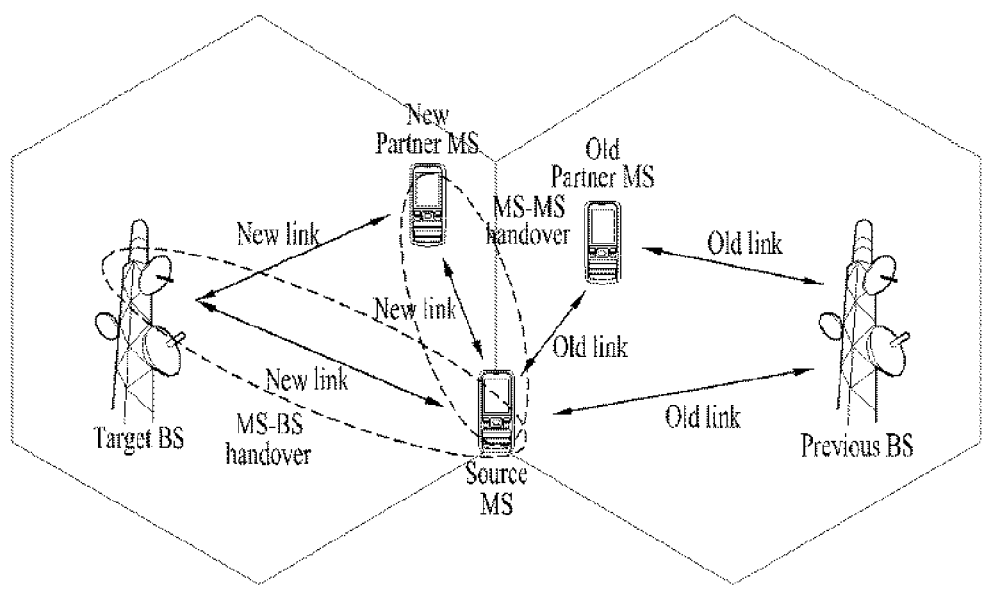

FIG. 18 is a diagram showing handover between a source MS and a BS according to an embodiment of the present invention.

Referring to FIG. 18, similarly to FIG. 17, the source MS moves from a coverage serviced by a previous BS to a coverage serviced by a target BS. When the source MS moves to the coverage serviced by the target BS, handover from the previous BS to the target BS occurs.

In this case, the source MS may find a new MS belonging to the coverage serviced by the handed-over BS (target BS) and perform M2M communication. That is, if a link or channel quality between the source MS and the old partner MS becomes less than a predetermined level or a link or channel quality between the old partner MS and the BS becomes less than a predetermined level, the source MS performs M2M communication with a new partner MS via handover between MSs. A method of performing handover between MSs (inter-MS handover) by the source MS will be described in greater detail below (2.2.).

2.2. Inter-MS Handover

As described above, the source MS may or may not perform handover between MSs while performing handover between the source MS and the BS or may perform only handover between MSs without performing handover between the source MS and the BS.

Figure 19:
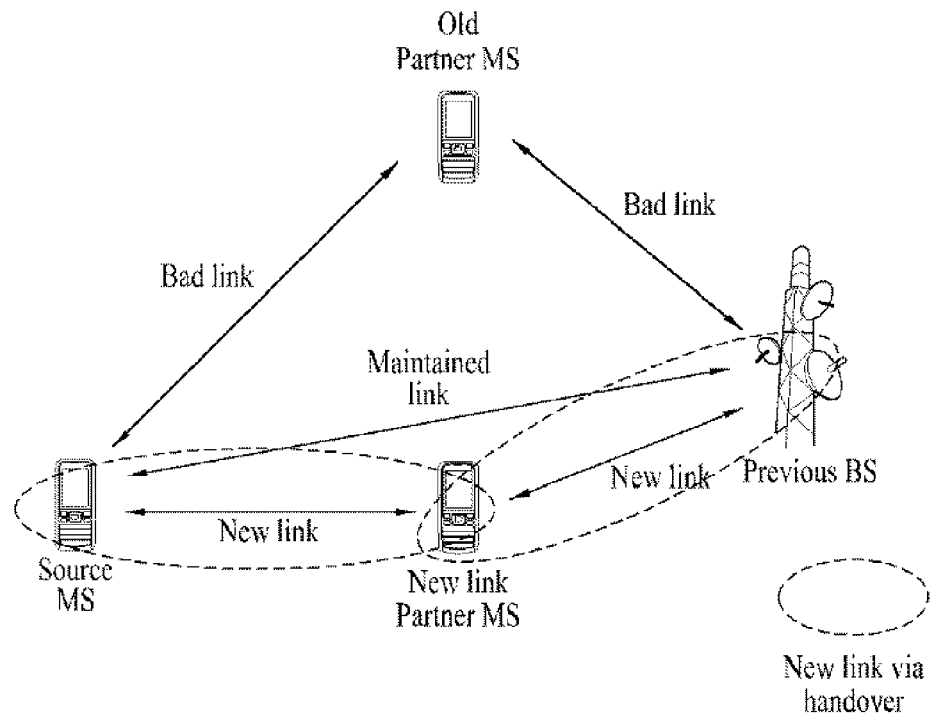
FIG. 19 is a diagram showing handover between MSs according to an embodiment of the present invention.

FIG. 19 is a diagram showing inter-MS handover according to an embodiment of the present invention.

Referring to FIG. 19, if a link or channel quality between the source MS and the old partner MS becomes less than a predetermined level or a link or channel quality between the old partner MS and the BS becomes less than a predetermined level, the source MS performs M2M communication with a new partner MS via inter-MS handover.

2.1.1. Case in which Link Between Source MS and Old Partner MS Becomes Less than Predetermined Level A method may be divided into two methods depending on whether an entity which collects channel information between the source MS and the old partner MS in order to initiate inter-MS handover is a source MS or an old partner MS. Since the following methods are independent, the source MS may perform inter-MS handover using any one method.

2.2.1.1. Collection of Channel Information by Source MS

Figure 20:
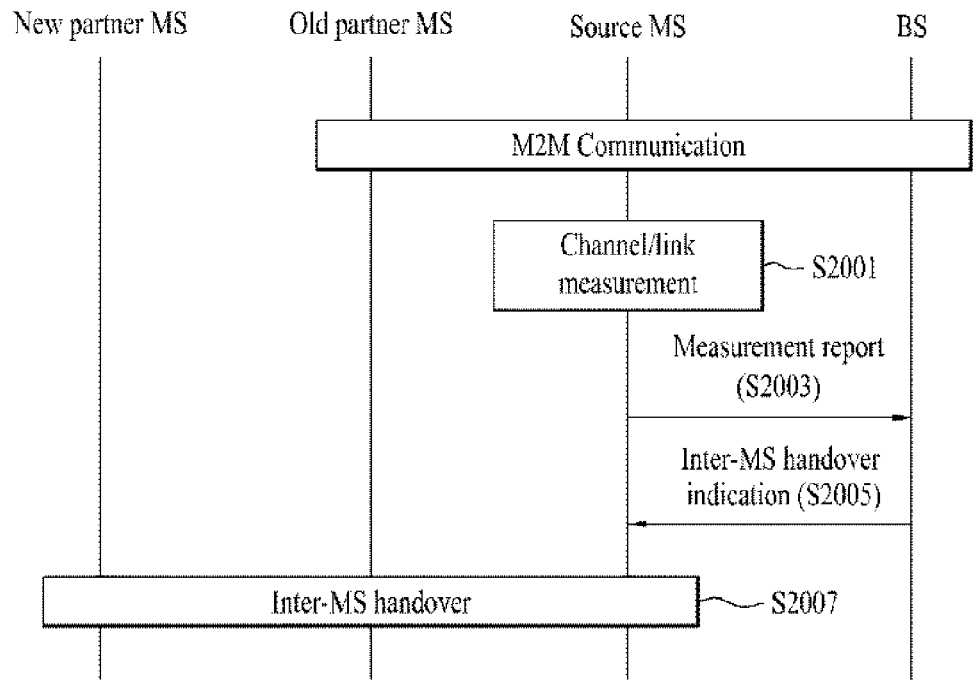
FIGS. 20 to 27 are diagrams showing a process of initiating handover between MSs according to an embodiment of the present invention.
Figure 21:
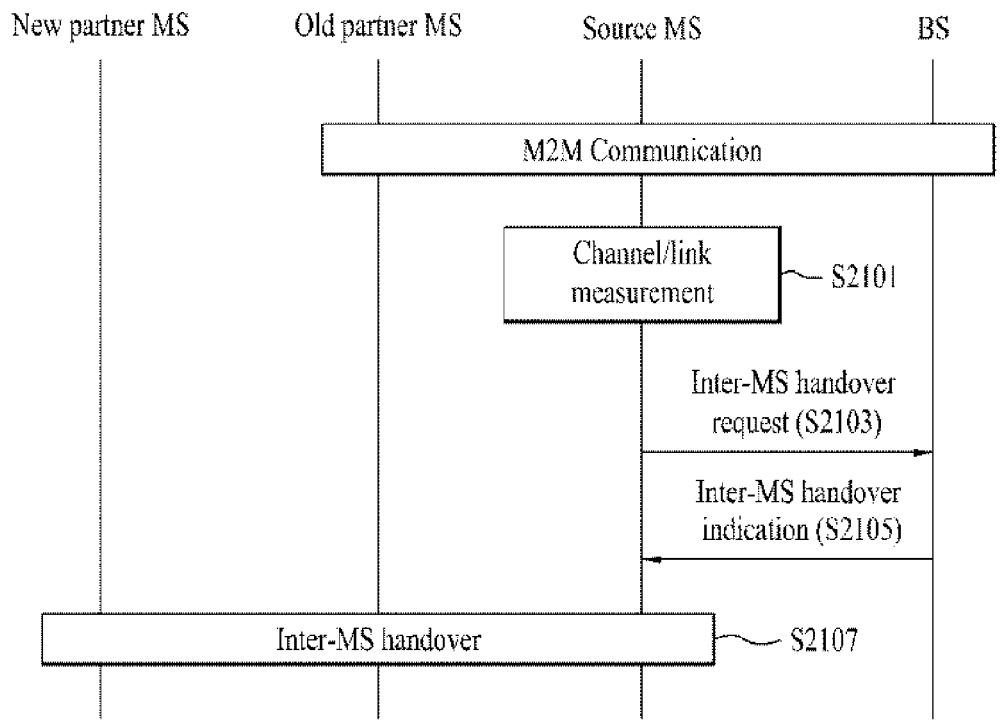

FIGS. 20 and 21 show a process of initiating inter-MS handover according to an embodiment of the present invention.

Referring to FIGS. 20 and 21, the source MS measures a link or channel quality with the old partner MS while performing M2M communication with the old partner MS/BS (S2001 of FIG. 20 and S2101 of FIG. 21).

More specifically, the source MS may measure the link or channel quality between the source MS and the partner MS using a signal to interference plus noise ratio (SINR) or a signal to noise ratio (SNR).

Alternatively, the source MS may measure the link or channel quality between the source MS and the old partner MS using a bit error ratio (BER) or a frame error ratio (FER). At this time, for security of data exchanged between the source MS and the old partner MS, the source MS may use separate signaling for suitability of data transmission, such as cyclic redundancy check (CRC), for the purpose of obtaining the FER between the source MS and the old partner MS and measure the link or channel quality using such signaling.

In addition, the source MS may measure the link or channel quality between the source MS and the old partner MS through the number of times of retransmission with the old partner MS. That is, the link or channel quality with the old partner MS may be measured depending on whether the number of times of retransmission exceeds a predetermined value for a predetermined period of time or whether retransmission is continuously performed a predetermined number of times.

In addition, the source MS measures the link or channel quality with the old partner MS through a MCS level of the signal exchanged with the old partner MS. That is, if the MCS level is less than a predetermined level, it may be determined that the link or channel quality is not good.

Referring to FIG. 20, the source MS transmits information about the link or channel quality measured in step S2001 to the BS (S2003). That is, the source MS may transmit information about the SINR or SNR value to the BS. Alternatively, the source MS may transmit information about the BER or FER value to the BS. In addition, information about the number of times of retransmission with the old partner MS or the number of times of continuous retransmission may be transmitted to the BS. In addition, information about the MCS level with the old partner MS may be transmitted to the BS.

The BS analyzes the link or channel quality between the source MS and the old partner MS based on the information received from the source MS and indicates handover to the source MS if it is determined that inter-MS handover is necessary (S2005). That is, if the SNR or SINR value is less than a predetermined reference value, the BS may determine that the channel quality between the source MS and the old partner MS becomes less than a predetermined level. In addition, if the BER or FER value exceeds a predetermined reference value, the BS may determine that the channel quality between the source MS and the old partner MS becomes less than a predetermined level. In addition, if the number of times of retransmission between the source MS and the old partner MS for a predetermined period of time exceeds a predetermined value or if the number of times of continuous retransmission exceeds a predetermined value, the BS may determine that the channel quality between the source MS and the old partner MS becomes less than a predetermined level. In addition, if the MCS level between the source MS and the old partner MS is less than a predetermined value, the BS may determine that the channel quality between the source MS and the old partner MS becomes less than a predetermined level.

Meanwhile, the source MS may request handover from the BS and initiate inter-MS handover.

Referring to FIG. 21, the source MS analyzes the link or channel quality between the source MS and the old partner MS based on information about the link or channel measured in step S2101 and transmits an inter-MS handover request message to the BS if it is determined that inter-MS handover is necessary (S2103). The method of analyzing the link or channel quality between the source MS and the old partner MS by the source MS is equal to the method of analyzing the link or channel quality between the source MS and the old partner MS by the BS.

The source MS receives an inter-MS handover indication message from the BS in response to the inter-MS handover request message (S2105) and performs handover with a new partner MS.

Referring to FIGS. 20 and 21 again, the source MS receives the inter-MS handover indication message from the BS (S2005 of FIG. 20 and S2105 of FIG. 21), handover with the new partner MS is performed (S2007 of FIG. 20 and S2107 of FIG. 21). The new partner MS may be selected according to the above-described method (1.2.). At this time, the source MS may perform M2M communication using the old partner MS before inter-MS handover is completed and temporarily stop M2M communication until inter-MS handover is completed.

As in the first scheme described with reference to FIGS. 4 to 9, MSs which may potentially become new partner MSs or peripheral MSs of the source MS supporting M2M communication may broadcast the M2M communication reference signal for channel estimation between MSs periodically or at a certain time even when they do not currently perform M2M communication. The M2M communication reference signal used at this time may be equal to or different from the M2M communication reference signal for initiating M2M communication in the above description (1.2.). Even when the source MS currently performs M2M communication with the partner MS, source MS may receive the broadcasted M2M communication reference signal by the peripheral MSs and measure the link or channel quality with the peripheral MS.

In addition, as in the second scheme of FIGS. 10 to 16, the source MS may broadcast the M2M communication reference signal for channel estimation between MSs periodically or at a certain time even during M2M communication. The M2M communication reference signal used at this time may be equal to or different from the M2M communication reference signal for initiating M2M communication in the above description (1.2.). MSs which may potentially become new partner MS or peripheral MSs of the source MS supporting M2M communication may receive the M2M communication reference signal broadcasted by the source MS and measure the link or channel quality with the source MS, even when they do not currently perform M2M communication.

2.2.1.2. Collection of Channel Information by Partner MS

Figure 22:
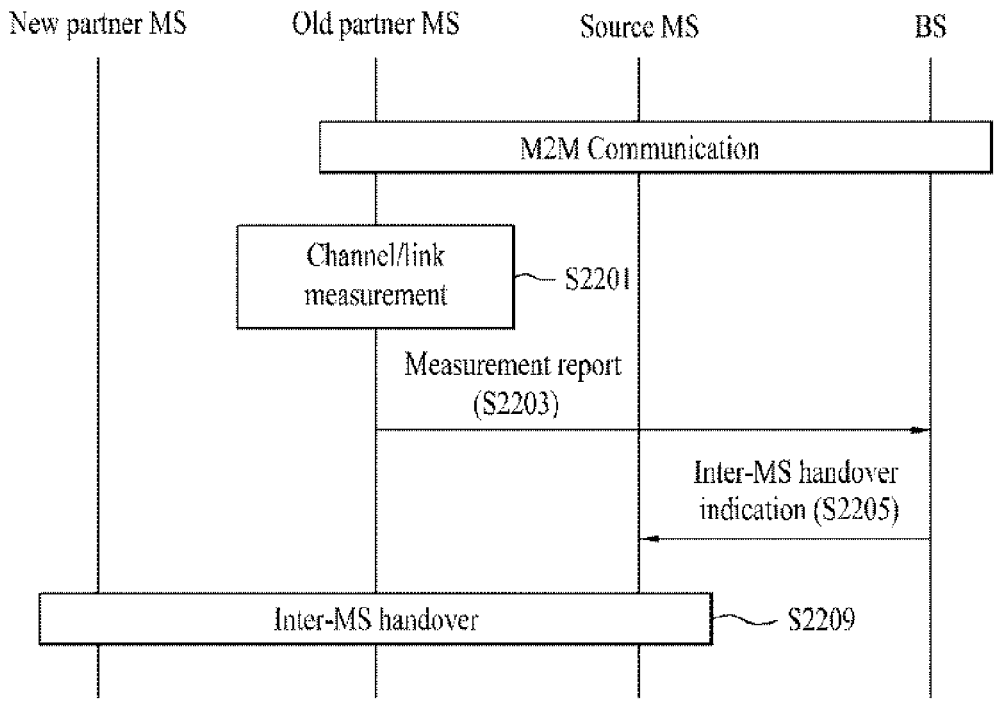
Figure 23:
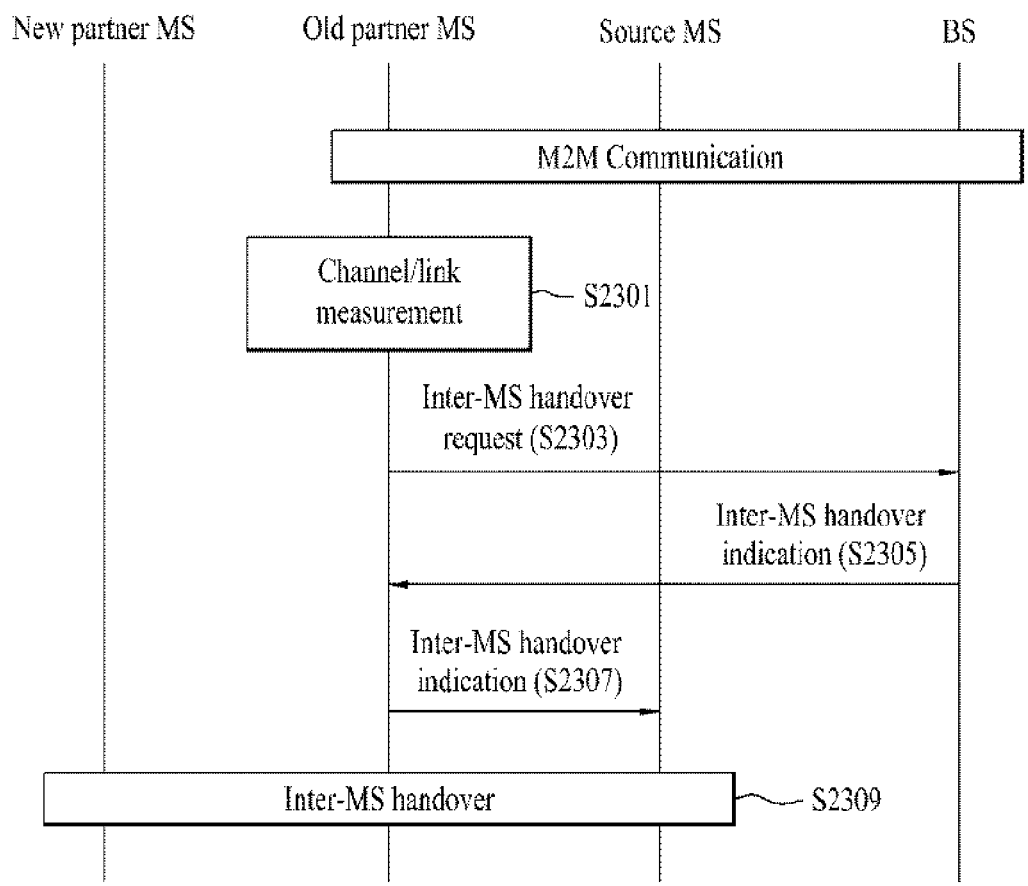
Figure 24:
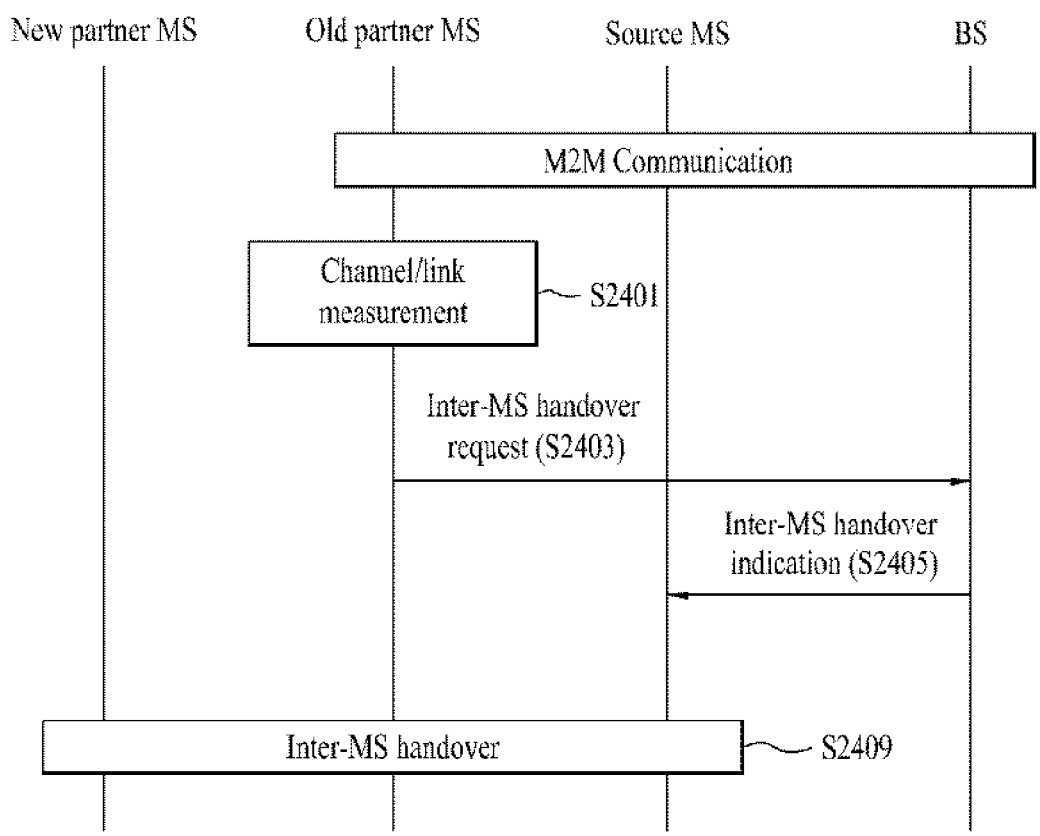

FIGS. 22 to 24 show a process of initiating inter-MS handover according to an embodiment of the present invention.

Referring to FIGS. 22 to 24, the old partner MS measures a link or channel quality with the source MS while the source MS performs M2M communication with the old partner MS/BS (S2201 of FIG. 22, S2301 of FIG. 23, and S2401 of FIG. 24). The method of measuring the link or channel quality with the source MS by the old partner MS is equal to the above-described method (2.2.1.1.).

Referring to FIG. 22, the old partner MS transmits information about the link or channel quality measured in step S2201 to the BS (S2203). Subsequently, the BS analyzes the link or channel quality between the source MS and the old partner MS based on the information received from the old partner MS and indicates handover to the source MS if it is determined that inter-MS handover is necessary (S2205).

Meanwhile, the old partner MS may request handover from the BS and initiate inter-MS handover.

Referring to FIG. 23, the old partner MS analyzes the link or channel quality between the source MS and the old partner MS based on information about the link or channel measured in step S2301 and transmits an inter-MS handover request message to the BS if it is determined that inter-MS handover is necessary (S2303). The old partner MS receives an inter-MS handover indication message from the BS in response to the inter-MS handover request message (S2305) and delivers the handover indication message to the source MS (S2307). At this time, a handover indication message may be replaced with the handover request acknowledge (ACK) message.

Referring to FIG. 24, the BS which receives the handover request message from the old partner MS may directly transmit the handover indication message to the source MS (S2405). In this case, the BS may transmit a handover request ACK message to the old partner MS in response to the handover request message while directly transmitting the handover indication message to the source MS.

Referring to FIGS. 22 and 24 again, the source MS receives the inter-MS handover indication message from the BS (S2205 of FIG. 22 and S2405 of FIG. 24) or receives the inter-MS handover indication message from the old partner MS (S2307 of FIG. 23), handover with the new partner MS is performed (S2209 of FIG. 22, S2309 of FIG. 23 and S2409 of FIG. 24). At this time, the method of performing handover with the new partner MS is equal to the above-described method (2.2.1.1.).

2.2.2. Case in which Link Between Old Partner MS and BS Becomes Less than Predetermined Level A method may be divided into two methods depending on whether an entity which collects channel information between the old partner MS and the BS in order to initiate inter-MS handover is an old partner MS or a BS. Since the following methods are independent, the source MS may perform handover between MSs using any one method.

2.2.2.1. Collection of Channel Information by Partner MS

Figure 25:
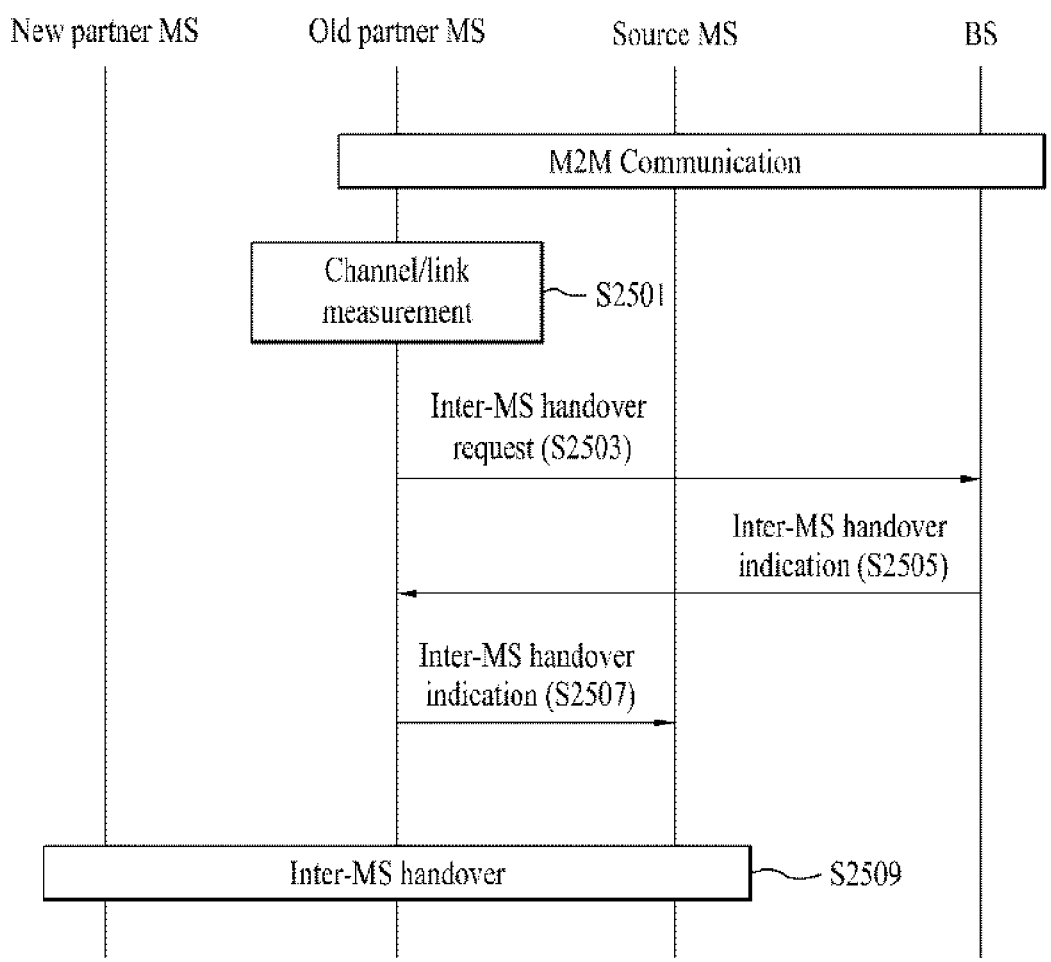
Figure 26:
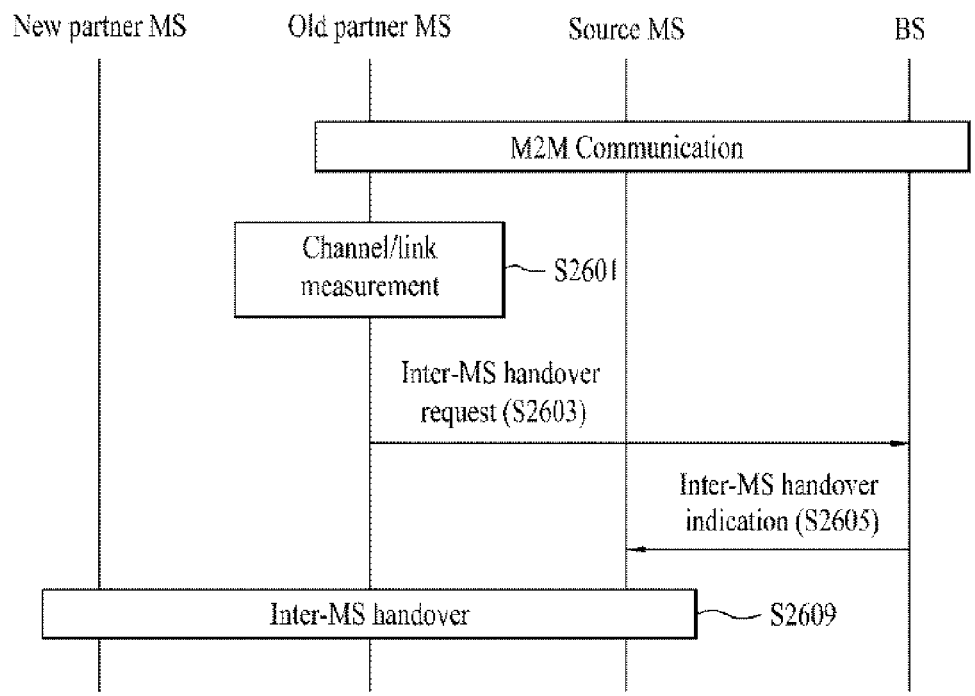

FIGS. 25 and 26 show a process of initiating inter-MS handover according to an embodiment of the present invention.

Referring to FIGS. 25 and 26, the old partner MS measures a link or channel quality with the BS while the source MS performs M2M communication with the old partner MS/BS (S2501 of FIG. 25 and S2601 of FIG. 26). The method of measuring the link or channel quality with the source MS by the old partner MS is equal to the above-described method (2.2.1.1.).

Referring to FIG. 25, the old partner MS analyzes the link or channel quality between the old partner MS and the BS based on the information about the link or channel quality measured in step S2501 and transmits an inter-MS handover request message to the BS if it is determined that inter-MS handover is necessary (S2503). The old partner MS receives an inter-MS handover indication message from the BS in response to the inter-MS handover request message (S2505) and delivers the handover indication message to the source MS (S2507).

Referring to FIG. 26, the BS which receives the handover request message from the old partner MS may directly transmit the handover indication message to the source MS (S2605). In this case, the BS may transmit a handover request ACK message to the old partner MS in response to the handover request message while directly transmitting the handover indication message to the source MS.

Referring to FIGS. 25 and 26 again, the source MS receives the inter-MS handover indication message from the old partner MS (S2507 of FIG. 25) or receives the inter-MS handover indication message from the BS (S2605 of FIG. 26), handover with the new partner MS is performed (S2509 of FIG. 25 and S2609 of FIG. 26). At this time, the method of performing handover with the new partner MS is equal to the above-described method (2.2.1.1.).

2.2.2.2. Collection of Channel Information by BS

Figure 27:
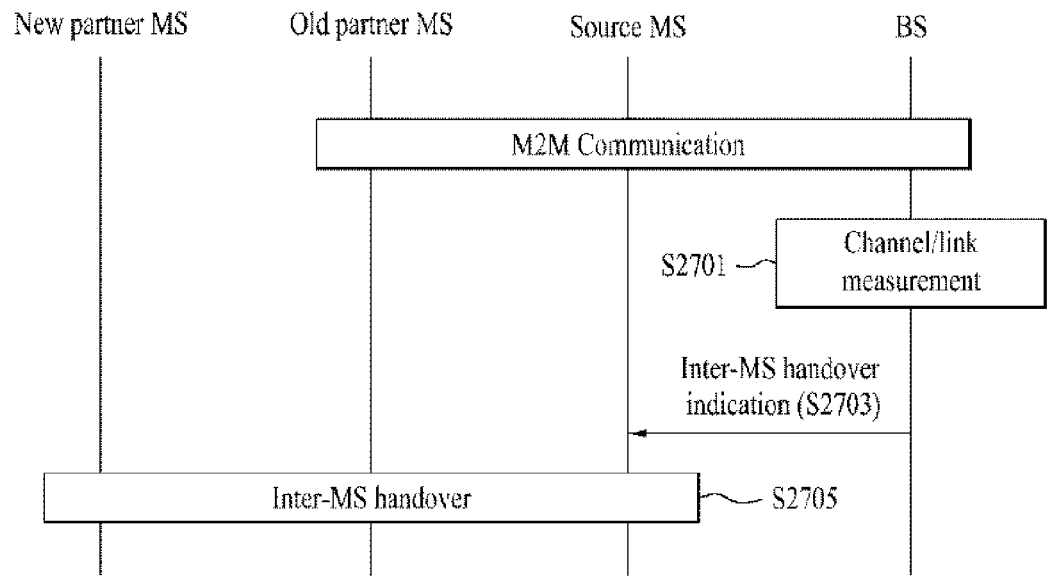

FIG. 27 shows a process of initiating inter-MS handover according to an embodiment of the present invention.

Referring to FIG. 27, the BS measures a link or channel quality between the BS and the old partner MS while the source MS performs M2M communication with the old partner MS/BS (S2701 of FIG. 27). The method of measuring the link or channel quality between the BS and the old partner MS by the BS is equal to the above-described method (2.2.1.1.).

The BS analyzes the link or channel quality between the BS and the old partner MS based on the information about the link or channel quality measured in step S2701 and transmits an inter-MS handover indication message to the source MS if it is determined that inter-MS handover is necessary (S2703).

The source MS performs handover with a new partner MS (S2705) when receiving the inter-MS handover indication message from the BS (S2703). At this time, the method of performing handover with the new partner MS is equal to the above-described method (2.2.1.1.).

If the source MS completes inter-MS handover with the new partner MS according to the embodiments of FIGS. 20 to 27, an M2M communication end message may be transmitted to the old partner MS. At this time, the M2M communication end message may be transmitted from the BS to the old partner MS or from the source MS to the old partner MS.

Even when the source MS completes inter-MS handover with the new partner MS, a separate M2M communication end message may not be transmitted to the old partner MS. In this case, the old partner MS no longer performs a process of performing M2M communication with the source MS if a signal according to M2M communication is not received from the source MS or the BS for a predetermined time or a predetermined frame or a control signal for maintaining the link is not received.

2.3. Case in which Handover Between Source MS and BS and Handover Between MSs are Simultaneously Performed If handover between the source MS and the BS and handover between MSs are simultaneously performed, handover may be performed using the following methods. Since the following methods are independent, the source MS may simultaneously perform handover between the source MS and the BS and handover between MSs using any one method.

1) The source MS may perform handover between MSs while performing handover with the BS. That is, if the source MS is handed over from a currently communicating BS to a new BS (target BS), a handover procedure with the BS is initiated and, at the same time, an M2M communication initiation process is performed again according to the method (1.2.) and source MS selects a new partner MS for performing M2M communication with the new BS.

2) The source MS may complete a handover procedure with the BS and then perform handover between MSs. That is, if the source MS is handed over from a currently communicating BS to a new BS, the source MS may perform an M2M communication initiation process according to the method (1.2.) after completing the handover procedure to the new BS and select a new partner MS for performing M2M communication with the new BS.

3. The BS may allocate a certain MS to the source MS as a temporary partner MS while the source MS performs a handover procedure with the BS. That is, if the source MS is handed over from a currently communicating BS to a new BS, a handover procedure with the BS is initiated and, at the same time, the new BS may allocate a certain MS as a temporary partner MS based on location information of the source MS. At this time, the source MS or the peripheral MS of the source MS may simultaneously the channel estimation result of the method (1.2.) to the BS with which the source MS currently communicates and the new BS and the new BS may designate a temporary partner MS based on the received channel estimation result.

The source MS may perform handover between MSs to the temporary partner MS while or after performing handover to a new BS and establish a new M2M communication link. In addition, the source MS may continuously perform M2M communication with the temporary partner MS as the partner MS or may select a new MS as a partner MS to perform inter-MS handover. The process of selecting the new MS may be performed according to the above-described method (1.2.). At this time, the source MS may perform M2M communication with the temporary partner MS before inter-MS handover is completed or temporarily stop M2M communication until inter-MS handover is completed.

4) The source MS may be allocated a certain MS as a temporary partner MS after completing a handover procedure with the BS. That is, if the source MS is handed over from a currently communicating BS to a new BS, the new BS may allocate a certain MS as the temporary partner MS based on location information of the source MS after the handover procedure with the BS is completed. At this time, the source MS or the peripheral MS of the source MS may simultaneously transmit the channel estimation result of the method (1.2.) to the BS with which the source MS currently communicates and the new BS and the new BS may designate the temporary partner MS based on the received channel estimation result.

The source MS may perform inter-MS handover to the temporary partner MS after handover to the new BS is completed and establish a new M2M communication link. In addition, the source MS may continuously perform M2M communication with the temporary partner MS as the partner MS or may select a new MS as a partner MS to perform inter-MS handover. The process of selecting the new MS may be performed according to the above-described method (1.2.). At this time, the source MS may perform M2M communication with the temporary partner MS before inter-MS handover is completed or temporarily stop M2M communication until inter-MS handover is completed.

3. Radio Access System to which the Present Invention is Applicable

Figure 28:
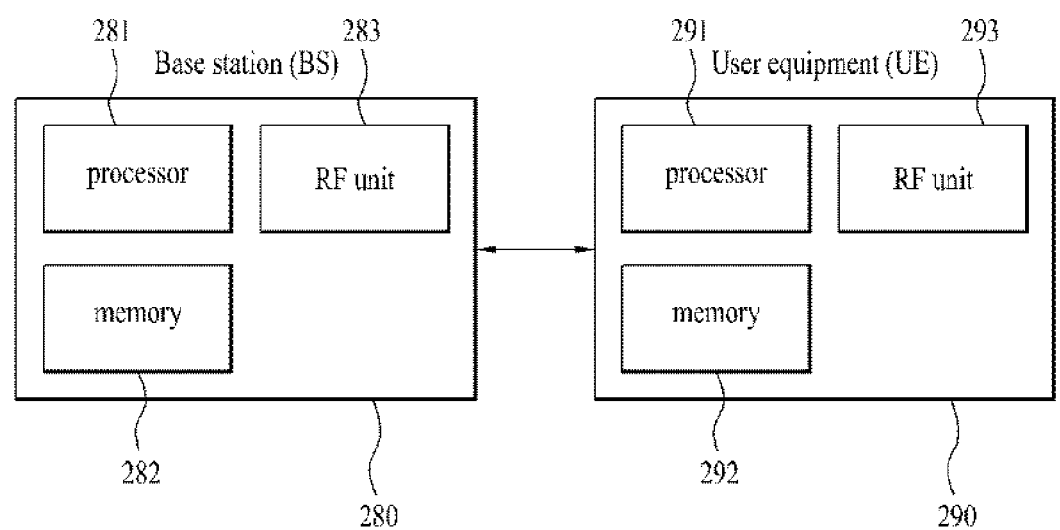
FIG. 28 is a block diagram showing a radio access system according to an embodiment of the present invention.

FIG. 28 is a block diagram showing a radio access system according to an embodiment of the present invention.

Referring to FIG. 28, the radio access system includes a BS 280 and a plurality of UEs 290 located in an area of the BS 280.

The BS 280 includes a processor 281, a memory 282 and a radio frequency (RF) unit 283. The processor 281 implements the proposed functions, processes and/or methods. Layers of a radio interface protocol may be implemented by the processor 281. The memory 282 is connected to the processor 281 to store a variety of information for operating the processor 281. The RF unit 283 is connected to the processor 281 to transmit and/or receive a RF signal.

The UE 290 includes a processor 291, a memory 292 and an RF unit 293. The processor 291 implements the proposed functions, processes and/or methods. Layers of a radio interface protocol may be implemented by the processor 291. The memory 292 is connected to the processor 291 to store a variety of information for operating the processor 291. The RF unit 293 is connected to the processor 291 to transmit and/or receive a RF signal.

The memories 282 and 292 may be internal or external memories of the processors 281 and 291 and may be connected to the processors 281 and 291 using various known means. The BS 280 and/or the UE 290 may have a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention are disclosed on the basis of a data communication relationship between a base station and a mobile station. Specific operations to be conducted by the base station in the present invention may also be conducted by an upper node of the base station as necessary. In other words, it will be obvious to those skilled in the art that various operations for enabling the base station to communicate with the mobile station in a network composed of several network nodes including the base station will be conducted by the base station or network nodes other than the base station. The term "Base Station" may be replaced with the terms fixed station, Node-B, eNode-B (eNB), or access point as necessary. The term "mobile station (MS)" may also be replaced with the term user equipment (UE), terminal equipment (TE), advanced mobile station (AMS), mobile subscriber station (MSS), mobile terminal (MT), user terminal (UT), subscriber station (SS), or wireless device as necessary.

The embodiments of the present invention can be implemented by a variety of means, for example, hardware, firmware, software, or a combination of them. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Mode for the Invention

Various embodiments have been described in the best mode for carrying out the invention.

Industrial Applicability

Although an example of applying an uplink control information transmission method in a radio access system according to the present invention to a 3GPP LTE system is described, the present invention is applicable to various radio access systems in addition to the 3GPP LTE system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of performing inter-mobile station handover in a radio access system, the method performed by a source mobile station (MS) and comprising:
   receiving reference signals for channel measurement from one or more MSs, while performing inter-MS communication with a first MS;
   measuring channel quality between the source MS and the one or more MSs using the reference signals for channel measurement;
   transmitting, to a base station (BS), information about the measured channel quality between the source MS and the one or more MSs;
   receiving an inter-MS handover indication message and information indicating a second MS among the one or more MSs, from the BS; and
   performing an inter-MS handover from the first MS to the second MS according to the inter-MS handover indication message,
   wherein the second MS is determined by the BS based on the information about the measured channel quality between the source MS and the one or more MSs.

2. The method according to claim 1, wherein the channel quality is measured using any one of a signal to interference plus noise ratio (SINR) value, a signal to noise ratio (SNR) value, a bit error ratio (BER) value, a frame error ratio (FER) value, the number of times of data retransmission and a modulation and coding scheme (MCS) level.

3. The method according to claim 1, wherein the performing the inter-MS handover includes performing the inter-MS handover while performing handover from the BS to another BS.

4. The method according to claim 1, wherein the performing the inter-MS handover includes performing the inter-MS handover after the first MS completes handover from the BS to another BS.

5. A mobile station (MS) for performing inter-MS handover in a radio access system, the MS comprising:
- a radio frequency (RF) unit; and
- a processor configured to
  - receive reference signals for channel measurement from one or more MSs, while performing inter-MS communication with a first MS, to measure channel quality between the source MS and the one or more MSs using the reference signals for channel measurement,
  - transmit, to a base station (BS) information about the measured channel quality between the source MS and the one or more MSs;
  - receive an inter-MS handover indication message and information indicating a second MS among the one or more MSs, from the BS, and
  - perform an inter-MS handover from the first MS to the second MS according to the inter-MS handover indication message,
- wherein the second MS is determined by the BS based on the information about the measured channel quality between the source MS and the one or more MSs.

* * * * *